(12) United States Patent
Ding

(10) Patent No.: US 12,316,568 B2
(45) Date of Patent: May 27, 2025

(54) DATA SENDING METHOD AND TERMINAL DEVICE

(71) Applicant: HUAWEI TECHNOLOGIES CO., LTD., Guangdong (CN)

(72) Inventor: Rentian Ding, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 264 days.

(21) Appl. No.: 18/020,741

(22) PCT Filed: Aug. 12, 2021

(86) PCT No.: PCT/CN2021/112264
§ 371 (c)(1),
(2) Date: Feb. 10, 2023

(87) PCT Pub. No.: WO2022/033550
PCT Pub. Date: Feb. 17, 2022

(65) Prior Publication Data
US 2024/0048322 A1 Feb. 8, 2024

(30) Foreign Application Priority Data
Aug. 12, 2020 (CN) .......................... 202010806625.2

(51) Int. Cl.
H04L 5/00 (2006.01)
H04B 7/06 (2006.01)
(52) U.S. Cl.
CPC ......... H04L 5/0051 (2013.01); H04B 7/0604 (2013.01)

(58) Field of Classification Search
CPC ... H04L 5/0051; H04B 7/0604; H04B 7/0404; H04B 7/0691; H04B 7/0608; H04B 17/309; H04B 17/382
See application file for complete search history.

(56) References Cited

U.S. PATENT DOCUMENTS

| 2015/0056933 | A1 | 2/2015 | Yan et al. | |
| 2023/0144253 | A1* | 5/2023 | Chen | H04W 72/1268 370/329 |
| 2023/0291523 | A1* | 9/2023 | Hasegawa | H04L 5/0051 |
| 2024/0031097 | A1* | 1/2024 | Go | H04L 5/0094 |

FOREIGN PATENT DOCUMENTS

| CN | 108768599 A | 11/2018 |
| CN | 112469125 A | 3/2021 |

* cited by examiner

Primary Examiner — Hashim S Bhatti
(74) Attorney, Agent, or Firm — WOMBLE BOND DICKINSON (US) LLP

(57) ABSTRACT

This application provides a data sending method and a terminal device. A plurality of antennas are configured for the terminal device, the plurality of antennas are configured to alternately send SRSs, the plurality of antennas include a first antenna and a second antenna. The terminal device determines to send a first SRS using the first antenna at a first moment; determines to send a second SRS using the second antenna at a second moment which is after the first moment; and determines to send first service data using the first antenna at a third moment which is after the second moment. The terminal device adjusts a transmit antenna of the first SRS as the second antenna, and adjusts a transmit antenna of the second SRS as the first antenna, to enable the transmit antenna of the second SRS to be consistent with a transmit antenna of the first service data.

20 Claims, 14 Drawing Sheets

DATA SENDING METHOD AND TERMINAL DEVICE

CROSS-REFERENCE TO RELATED APPLICATIONS

This application is a national stage of International Application No. PCT/CN2021/112264, filed on Aug. 12, 2021, which claims priority to Chinese Patent Application No. 202010806625.2, filed on Aug. 12, 2020. Both of the aforementioned applications are hereby incorporated by reference in their entireties.

TECHNICAL FIELD

This application relates to the field of terminal technologies, and in particular, to a data sending method and a terminal device.

BACKGROUND

A multi-antenna terminal may detect channel quality by using an alternating sounding reference signal (SRS) transmission mechanism. Alternating SRS transmission may be understood as: A terminal device alternately sends SRSs on a plurality of antennas, to complete detection on road conditions of transmission channels corresponding to all antennas. For example, the terminal device is provided with four antennas, and after sending an SRS on a first antenna, the terminal device switches to a second antenna to send an SRS until sending on all antennas is completed.

It is specified in an existing protocol that when SRSs are sent alternately, waiting duration is set between two consecutive SRSs (for example, after an SRS is sent on the first antenna, an SRS is sent on the second antenna after the waiting duration). However, no waiting duration is set between the SRS and uplink service data (for example, PUSCH data), that is, PUSCH data may be sent immediately after the SRS is sent.

However, there is a possible case: Antenna switching is needed for sending the SRS and the PUSCH data. For example, after an SRS is sent on an antenna 4, an antenna 1 needs to be switched to, to send PUSCH data. If the antenna 4 is immediately switched to the antenna 1 to send the PUSCH data after the SRS is sent on the antenna 4, a high PUSCH bit error rate occurs due to unstable power (because the antenna switching needs power stability duration), and accuracy of the PUSCH data received by a receive end such as a network side device is low.

SUMMARY

An objective of this application is to provide a data sending method and a terminal device, to avoid a high bit error rate caused by antenna switching.

According to a first aspect, a data sending method is provided. The method is applied to a terminal device, and the terminal device is, for example, a mobile phone or a tablet computer. A plurality of antennas are configured for the terminal device, the plurality of antennas are configured to alternately send sounding reference signals (SRSs), and the plurality of antennas include a first antenna and a second antenna. The method includes: The terminal device determines that a first SRS needs to be sent by using the first antenna at a first moment. The terminal device determines that a second SRS needs to be sent by using the second antenna at a second moment, where the second moment is after the first moment. The terminal device determines that first service data needs to be sent by using the first antenna at a third moment, where the third moment is after the second moment. The terminal device adjusts a transmit antenna of the first SRS as the second antenna, and adjusts a transmit antenna of the second SRS as the first antenna, to enable the transmit antenna of the second SRS to be consistent with a transmit antenna of the first service data. The terminal device sends the first SRS by using the second antenna at the first moment, sends the second SRS by using the first antenna at the second moment, and sends the first service data by using the first antenna at the third moment.

In an embodiment of the application, an alternating SRS transmission sequence of the plurality of antennas may be adjusted. For example, an original alternating transmission sequence is as follows: After the first SRS is sent on the first antenna, the second SRS is sent on the second antenna. An adjusted alternating transmission sequence is as follows: After the first SRS is sent on the second antenna, the second SRS is sent on the first antenna. In this way, antenna switching does not need to be performed when the first service data is sent after the second SRS is sent. This avoids a high bit error rate caused by unstable power (because antenna switching needs power stability duration), and improves accuracy of the first service data received by a receive end such as a network side device.

In an embodiment, a time difference between the third moment and the second moment is less than a threshold, and the threshold is less than or equal to 15 microseconds.

It may be understood that, if a time difference between a sending time point of the first service data and a sending time point of the second SRS is less than the threshold, there is no sufficient time to stabilize power. In this case, an alternating SRS transmission sequence of the plurality of antennas may be adjusted to enable the transmit antenna of the first service data to be consistent with the transmit antenna of the second SRS, so that a high bit error rate caused by unstable power is avoided, and accuracy of the first service data received by the receive end such as the network side device is improved.

In an embodiment, that the terminal device determines that first service data needs to be sent by using the first antenna at a third moment includes: The terminal device receives an indication message sent by the network side device, where the indication message is used to indicate the terminal device to send the first service data by using the first antenna at the third moment.

In an embodiment of the application, the sending time point and/or the transmit antenna of the first service data may be indicated by the network side device, or the transmit antenna may be specified by default, for example, specified in a protocol that the transmit antenna does not need to be indicated by the network side device, or the sending time point of the first service data may be determined by the terminal device. This is not limited in an embodiment of the application.

In an embodiment, the plurality of antennas further includes a third antenna, and the method further includes: The terminal device determines that a third SRS needs to be sent by using the third antenna at a fourth moment, where the fourth moment is after the third moment.

The terminal device determines that second service data needs to be sent by using the first antenna at a fifth moment, where the fifth moment is after the fourth moment. The terminal device adjusts a transmit antenna of the second service data as the third antenna, to enable the transmit antenna of the second service data to be consistent with a transmit antenna of the third SRS. The terminal device sends the third SRS by using the third antenna at the fourth moment, and sends the second service data by using the third antenna at the fifth moment.

When the terminal device includes the first antenna, the second antenna, and the third antenna, because an alternating SRS transmission sequence of the first antenna and the second antenna is adjusted, both transmit antennas of the second SRS and the first service data are the first antenna. In this case, the transmit antenna of the third SRS cannot be adjusted as the first antenna because the first antenna is adjusted to send the second SRS. In this case, the terminal device may adjust the transmit antenna of the second service data as the third antenna, to enable the transmit antenna of the second service data to be consistent with the transmit antenna of the third SRS, so that a high bit error rate caused by unstable power is avoided, and accuracy of the first service data received by the receive end such as the network side device is improved.

In an embodiment, the SRS is an SRS having an antenna switch (AS) function.

It should be noted that an SRS having an AS function may be referred to as an AS SRS for short. The AS SRS is used to detect a downlink receiving capability. For example, when the terminal device has four antennas, downlink receiving capabilities corresponding to the four antennas need to be detected. If the terminal device is in a TDD mode, an uplink road condition and a downlink road condition are the same. Therefore, a detected uplink road condition can reflect a downlink road condition. Therefore, a terminal device having four antennas may alternately send AS SRSs on the four antennas to detect an uplink road condition (which is to detect a downlink road condition).

In an embodiment, the method further includes: The terminal device sends a notification message to the network side device, where the notification message is used to notify the network side device that the transmit antenna of the second service data is the third antenna.

In an embodiment of the application, a case is considered: Service data may be sent by using the first antenna by default, and therefore, when adjusting the transmit antenna of the second service data as the third transmit antenna, the terminal device may notify the network side device that the transmit antenna of the second service data is the third antenna.

For example, for the network side device, physical antennas of the terminal device are distinguished by using antenna ports. It is assumed that the first antenna corresponds to an antenna port 0, and the third antenna corresponds to a port 2. The notification message sent by the terminal device to the network side device may carry a mark of the antenna port 2, to indicate the terminal device to adjust the transmit antenna of the second service data as the third antenna.

In an embodiment, the method further includes: The terminal device sends a CB SRS to the network side device by using the third antenna at a sixth moment, where the sixth moment is before the fifth moment, and the CB SRS is used to evaluate quality of a transmission channel corresponding to the third antenna, to enable the network side device to receive the second service data on the third antenna based on a quality evaluation result of the transmission channel corresponding to the third antenna, where the CB SRS is an SRS having a codebook (CB)-based transmission function.

The CB SRS is used to detect quality of an uplink channel, and needs to have a same transmit antenna as service data. Therefore, after adjusting the transmit antenna of the second service data as the third antenna, the terminal device may also adjust a transmit antenna of the CB SRS as the third antenna. In this way, the CB SRS may evaluate quality of a transmission channel corresponding to the third antenna, so that the receive end, namely, the network side device, receives the second service data on the third antenna based on a channel quality evaluation result of the third antenna.

In an embodiment, the first service data includes at least one of the following: physical uplink shared channel (PUSCH) data, physical uplink control channel (PUCCH) data, or physical random access channel (PRACH) data; and the second service data includes at least one of the following: PUSCH data, PUCCH data, or PRACH data.

It should be noted that the foregoing merely lists several examples of the first service data and the second service data. This is not limited in an embodiment of the application.

According to a second aspect, a terminal device is further provided, including:
a processor;
a plurality of antennas, where the plurality of antennas are configured to alternately send sounding reference signals (SRSs); and
a computer storage medium, where the computer storage medium includes instructions; and when the processor executes the instructions, the terminal device is enabled to perform the following operations:
determining that the terminal device needs to send first service data by using a first antenna in the plurality of antennas at a first moment;
adjusting an alternating SRS transmission sequence of the plurality of antennas from a first sequence to a second sequence, where in the first sequence, an SRS is sent by using a second antenna at a second moment that is before the first moment; and in the second sequence, an SRS is sent by using the first antenna at the second moment; and
controlling the SRSs to be sent alternately according to the second sequence by using the plurality of antennas, where the first service data is sent by using the first antenna at the first moment.

In an embodiment of the application, an alternating SRS transmission sequence of the plurality of antennas may be adjusted. For example, the original first sequence is adjusted to the second sequence. A difference between the first sequence and the second sequence lies in that: in the first sequence, an SRS is sent to the second antenna at the second moment that is before the first moment; and in the second sequence, an SRS is sent to the first antenna at the second moment. In this way, when the first service data is sent after the SRS is sent at the second moment, antenna switching does not need to be performed. This avoids a high bit error rate caused by unstable power (because antenna switching needs power stability duration), and improves accuracy of the first service data received by a receive end such as a network side device.

In an embodiment, a time difference between the second moment and the first moment is less than a threshold, and the threshold is less than or equal to 15 microseconds.

In an embodiment, the terminal device further performs the following operation: receiving an indication message sent by the network side device, where the indication message is used to indicate that the terminal device needs to send the first service data by using the first antenna at the first moment.

In an embodiment, the plurality of antennas further include a third antenna. In the second sequence, an SRS is sent to the third antenna at a third moment, where the third moment is after the first moment. The terminal device further performs the following operations: determining that the terminal device needs to send second service data by using the first antenna at a fourth moment, where the fourth moment is after the third moment; adjusting a transmit antenna of the second service data as the third antenna; and controlling the second service data to be sent by using the third antenna at the fourth moment.

In an embodiment, the SRS is an SRS having an antenna switch (AS) function.

In an embodiment, the terminal device further performs the following operation: sending a notification message to the network side device, where the notification message is used to notify the network side device that the transmit antenna of the second service data is the third antenna.

In an embodiment, the terminal device further performs the following operation: sending a CB SRS to the network side device by using the third antenna at a sixth moment, where the sixth moment is before the fourth moment, and the CB SRS is used to evaluate quality of a transmission channel corresponding to the third antenna, to enable the network side device to receive the second service data on the third antenna based on a quality evaluation result of the transmission channel corresponding to the third antenna, where the CB SRS is an SRS having a codebook (CB)-based transmission function.

In an embodiment, the first service data includes at least one of the following: physical uplink shared channel (PUSCH) data, physical uplink control channel (PUCCH) data, or physical random access channel (PRACH) data; and the second service data includes at least one of the following: PUSCH data, PUCCH data, or PRACH data.

According to a third aspect, a chip system is further provided, applied to a terminal device. The chip system includes an application processor and a baseband processor. The chip system is configured to connect to a plurality of antennas. The plurality of antennas are configured to alternately send sounding reference signals (SRSs).

The application processor is configured to determine that the terminal device needs to send first service data by using a first antenna in the plurality of antennas at a first moment.

The application processor is further configured to adjust an alternating SRS transmission sequence of the plurality of antennas from a first sequence to a second sequence, where in the first sequence, an SRS is sent by using a second antenna at a second moment that is before the first moment; and in the second sequence, an SRS is sent by using the first antenna at the second moment.

The baseband processor is configured to control the SRSs to be sent alternately according to the second sequence by using the plurality of antennas, where the first service data is sent by using the first antenna at the first moment.

In an embodiment, a time difference between the second moment and the first moment is less than a threshold, and the threshold is less than or equal to 15 microseconds.

In an embodiment, the plurality of antennas are further configured to receive an indication message sent by a network side device, where the indication message is used to indicate that the terminal device needs to send the first service data by using the first antenna at the first moment.

In an embodiment, the plurality of antennas further include a third antenna. In the second sequence, an SRS is sent to the third antenna at a third moment, where the third moment is after the first moment. The application processor is further configured to: determine that the terminal device needs to send second service data by using the first antenna at a fourth moment, where the fourth moment is after the third moment; and adjust a transmit antenna of the second service data as the third antenna. The baseband processor is further configured to control the second service data to be sent by using the third antenna at the fourth moment.

In an embodiment, the SRS is an SRS having an antenna switch (AS) function.

In an embodiment, the baseband processor is further configured to send a CB SRS to the network side device by using the third antenna at a sixth moment, where the sixth moment is before the fourth moment, and the CB SRS is used to evaluate quality of a transmission channel corresponding to the third antenna, to enable the network side device to receive the second service data on the third antenna based on a quality evaluation result of the transmission channel corresponding to the third antenna, where the CB SRS is an SRS having a codebook (CB)-based transmission function.

According to a fourth aspect, a terminal device is further provided, including modules/units for performing the method according to any one of the first aspect or the possible designs of the first aspect. These modules/units may be implemented by hardware, or may be implemented by hardware executing corresponding software.

For example, the terminal device includes a processing unit and a communications unit. The processing unit is configured to: determine that a first SRS needs to be sent by using a first antenna at a first moment; determine that a second SRS needs to be sent by using a second antenna at a second moment, where the second moment is after the first moment; and determine that first service data needs to be sent by using the first antenna at a third moment, where the third moment is after the second moment.

The processing unit is further configured to: adjust a transmit antenna of the first SRS as the second antenna, and adjust a transmit antenna of the second SRS as the first antenna, to enable the transmit antenna of the second SRS to be consistent with a transmit antenna of the first service data.

The communications unit is configured to send the first SRS by using the second antenna at the first moment, send the second SRS by using the first antenna at the second moment, and send the first service data by using the first antenna at the third moment.

According to a fifth aspect, a system is further provided, including:
 a network device, configured to provide a network service for a terminal device; and
 the terminal device, configured to implement the terminal device in the method provided in the first aspect.

According to a sixth aspect, a computer program product including instructions is further provided. When the computer program product runs on a computer, the computer is enabled to perform the method provided in the first aspect.

According to a seventh aspect, a computer storage medium is further provided, including computer instructions. When the computer instructions are run on a terminal device, the terminal device is enabled to perform the method provided in the first aspect.

For beneficial effects of the second aspect to the seventh aspect, refer to the beneficial effects of the first aspect. Details are not described again.

DESCRIPTION OF EMBODIMENTS

Figure 1:
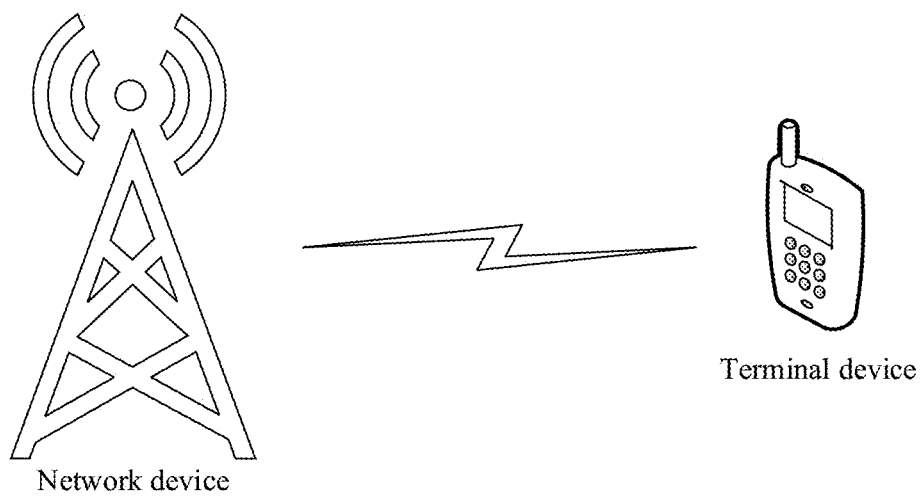
FIG. 1 is a schematic diagram of an application scenario according to an embodiment of this application.

The following describes some terms in embodiments of this application, to facilitate understanding of one of ordinary skilled in the art.

(1) A terminal (terminal) in this application includes a device that provides a user with voice and/or data connectivity, for example, may include a handheld device having a wireless connection function or a processing device connected to a wireless modem. The terminal may communicate with a core network through a radio access network (RAN), and exchange a voice and/or data with the RAN. The terminal may include user equipment (UE), a wireless terminal, a mobile terminal, a subscriber unit, a subscriber station, a mobile station, a mobile, a remote station, an access point, a remote terminal, an access terminal, a user terminal, a user agent, a user device, or the like. For example, the terminal may include a mobile phone (or referred to as a "cellular" phone), a computer having a mobile terminal, a portable, pocket-sized, handheld, computer built-in mobile apparatus, or a smart wearable device. For example, the terminal may be a device such as a personal communication service (PCS) phone, a cordless phone, a session initiation protocol (SIP) phone, a wireless local loop (WLL) station, or a personal digital assistant (PDA). The terminal may alternatively include a limited device, for example, a device with relatively low power consumption, a device with a limited storage capability, or a device with a limited computing capability. For example, the terminal includes an information sensing device such as a barcode, radio frequency identification (RFID), a sensor, a global positioning system (GPS), or a laser scanner.

By way of example instead of a limitation, in embodiments of this application, the terminal may alternatively be a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that can be directly worn by the user or integrated into clothes or an accessory of the user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that dedicated to only one type of application function and need to collaboratively work with other devices such as smartphones, for example, various smart bands, smart helmets, or smart jewelry for monitoring physical signs.

If the various terminals described above are located on a vehicle (for example, placed in the vehicle or installed in the vehicle), the terminals may be considered as vehicle-mounted terminals. For example, the vehicle-mounted terminals are also referred to as on board units (OBUs).

In embodiments of this application, an apparatus configured to implement a function of the terminal may be a terminal device, or may be an apparatus, for example, a chip system, that can support the terminal device in implementing the function. The apparatus may be installed in the terminal device. In embodiments of this application, the chip system may include a chip, or may include a chip and another discrete device. In the following, an example in which an apparatus configured to implement a function of a terminal is a terminal device is used.

(2) A network device in this application may be a device configured to communicate with a terminal. In embodiments of this application, the network device may be referred to as a radio access network (RAN) device, and includes, for example, an access network (AN) device, for example, a base station (for example, an access point), and may be a device that communicates with a wireless terminal over an air interface through one or more cells in an access network. Alternatively, for example, a network device in a V2X technology is a roadside unit (RSU). The base station may be configured to mutually convert a received over-the-air frame and an Internet Protocol (IP) packet and serve as a router between the terminal and a rest portion of the access network, where the rest portion of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (eNB, or e-NodeB, evolved Node B) in a long term evolution (LTE) system or a long term evolution-advanced (LTE-A) system, may include a next generation NodeB (gNB) in an NR system, or may include a centralized unit (CU) and a distributed unit (DU) in a cloud radio access network (Cloud RAN) system. This is not limited in embodiments of this application.

In embodiments of this application, an apparatus configured to implement a function of the network device may be a network device, or may be an apparatus, for example, a chip system, that can support the network device in implementing the function. The apparatus may be installed in the network device. In the following, an example in which an apparatus configured to implement a function of a network device is a network device is used.

(3) A resource in embodiments of this application may also be referred to as a transmission resource, including one or more of a time domain resource, a frequency domain resource, and a code channel resource. The resource may be used to carry data or signaling in an uplink communication process or a downlink communication process.

(4) Terms "system" and "network" may be used interchangeably in embodiments of this application. The term "a plurality of" means two or more, and another quantifier is similar to this. The term "and/or" describes an association relationship between associated objects and indicates that three relationships may exist. For example, A and/or B may indicate the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one of . . . " means one or any combination of subsequent associated objects. For example, "at least one of A, B, and C" includes A, B, C, AB, AC, BC, or ABC. It should be understood that in embodiments of this application, "B corresponding to A" indicates that B is associated with A, and B may be determined based on A. However, it should be further understood that determining B based on A does not mean that B is determined based only on A. B may alternatively be determined based on A and/or other information.

It should be noted that, in descriptions of this application, words such as "first" and "second" are merely used for distinction and description, and cannot be understood as an indication or implication of relative importance or an indication or implication of a sequence. For example, "first SRS" and "second SRS" represent only two different SRSs, and have no sequence or relative importance.

(5) "Connection" in embodiments of this application means various connection manners such as a direct connection or an indirect connection, for implementing communication between devices. This is not limited in embodiments of this application.

The following describes the technical solutions in embodiments of this application with reference to the accompanying drawings in embodiments of this application.

FIG. 1 is a schematic diagram of an application scenario according to an embodiment of this application. The application scenario includes a network device and a terminal device. The network device may communicate with the terminal device, to provide a network service for the terminal device. The network device may be a 3G, 4G, 5G, 6G base station, or the like. The terminal device may be a mobile phone, a tablet computer, a notebook computer, or the like. A user uses the terminal device to access the Internet.

Figure 2:
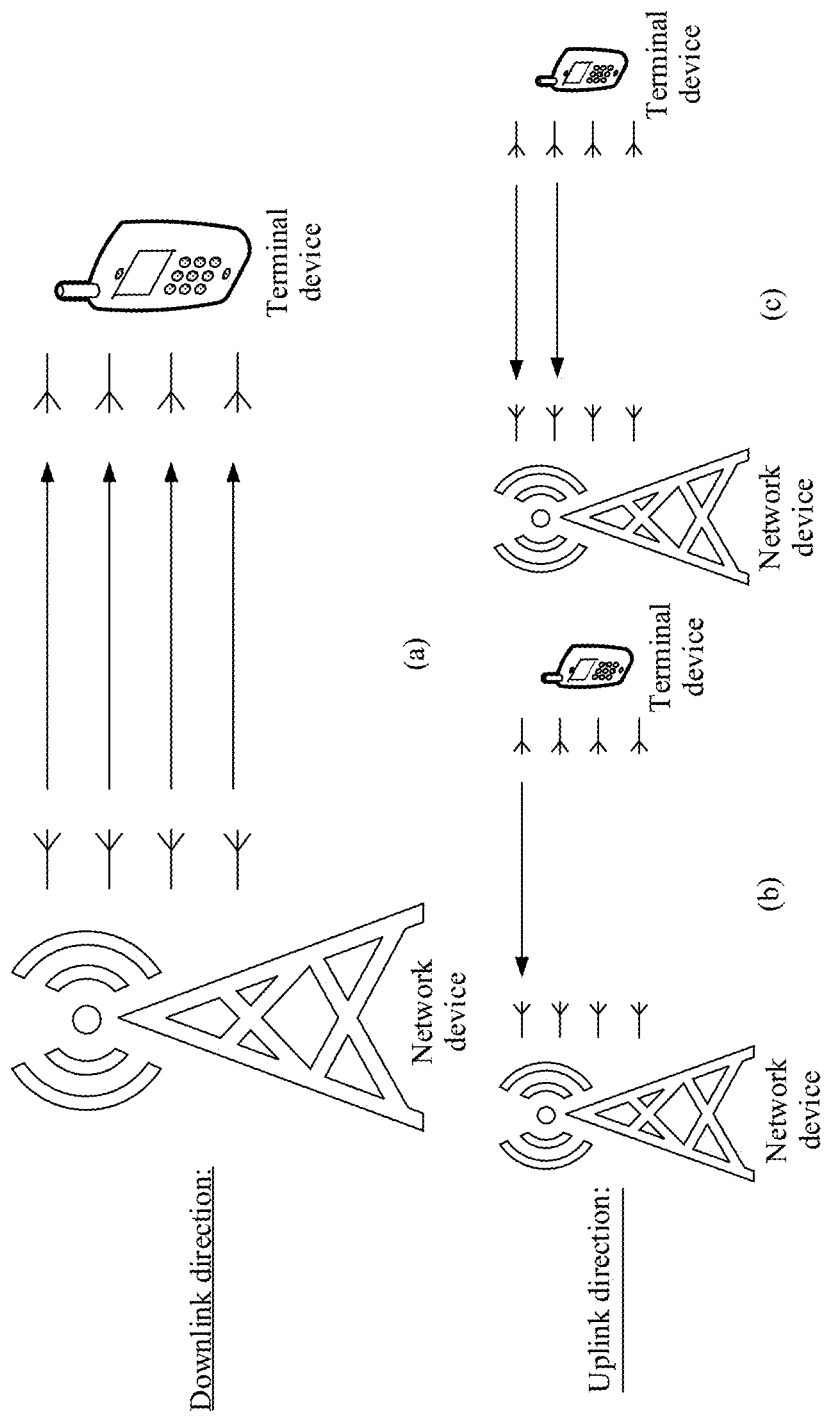
FIG. 2 is a schematic diagram of information transmission between a network device and a terminal device according to an embodiment of this application.

To improve a network speed, a multiple-input multiple-output (MIMO) technology is proposed. A basic principle of this technology is to deploy a plurality of antennas at a transmit end and a receive end, so that data can be simultaneously transmitted on a plurality of channels by using the plurality of antennas, and a network speed is improved. For example, as shown in FIG. 2, both the network device and the terminal device are provided with a plurality of antennas, for example, both the network device and the terminal device are provided with four antennas. (a) in FIG. 2 is used as an example. In a downlink direction, the network device simultaneously sends four channels of downlink data by using four antennas. Correspondingly, the terminal device simultaneously receives the four channels of downlink data by using the four antennas. Compared with data transmission efficiency by using one antenna, data transmission efficiency by using four antennas is greatly improved. However, because a capability of the terminal device is limited, in an uplink direction, the terminal device usually supports only single-antenna transmission or dual-antenna transmission. For example, as shown in (b) in FIG. 2, the terminal device supports sending uplink data by using a single antenna at a same moment. The terminal device is, for example, a terminal device in a non-standalone (NSA) networking mode. For another example, as shown in (c) in FIG. 2, the terminal device supports sending uplink data by using two antennas at a same moment. The terminal device is, for example, a terminal device in a standalone (SA) networking mode.

Generally, before sending downlink data, the network device detects a road condition of a downlink transmission channel. If the network device has four downlink transmission channels, the four downlink transmission channels need to be detected. For a time division duplexing (TDD) mode, an uplink transmission channel and a downlink transmission channel are the same, and the road conditions of the transmission channel are the same. Therefore, the downlink transmission channel can be determined by detecting the uplink transmission channel. In other words, the terminal device needs to detect four uplink transmission channels. However, as shown in (b) in FIG. 2 and (c) in FIG. 2, the terminal device supports only a single-transmission channel or a dual-transmission channel at a same moment. For example, the terminal device supports a single-transmission channel. To complete detection on the four uplink transmission channels, the terminal device needs to perform alternating detection on the four antennas. A signal used to detect a road condition of the uplink channel includes a sounding reference signal (SRS). Therefore, to complete detection on the four uplink channels by using a single-uplink channel or a dual-uplink channel, an alternating SRS transmission mechanism is proposed. In brief, alternating SRS transmission may be understood as: A terminal device alternately sends SRSs on a plurality of antennas, to complete detection on road conditions of transmission channels corresponding to all antennas.

Figure 3:
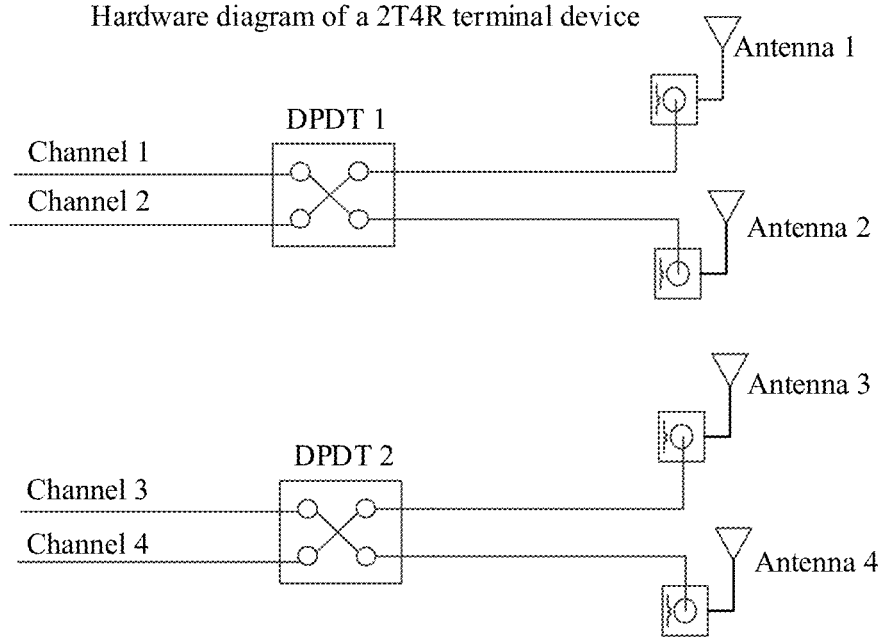
FIG. 3 is a schematic diagram of a structure of a 2T4R terminal device according to an embodiment of this application.

The alternating SRS transmission mechanism includes mechanisms such as 1T4R and 2T4R. In an example of "2T4R", "2" represents two antennas, "T" is used to indicate "Tx" and represents transmission, and "2T" means that "two antennas are used for transmission"; and "4" represents three antennas, "R" is used to indicate "Rx" and represents reception, and "4R" means that "four antennas are used for reception". Therefore, "2T4R" can be understood as follows: When SRSs are sent on two antennas at a same moment, two rounds of sending is needed to complete sending on the four antennas. FIG. 3 shows a part of a hardware structure of a terminal device supporting 2T4R. Four channels correspond to four antennas. An antenna 1 and an antenna 2 are connected to a channel 1 and a channel 2 by using a double-pole double-throw (DPDT) 1. An antenna 3 and an antenna 4 are connected to a channel 3 and a channel 4 by using a DPDT 2. When the channel 1 is an uplink channel (Tx), the channel 2 is switched to a downlink channel (Rx). Therefore, an SRS is sent on one of the antenna 1 and the antenna 2. When the channel 3 is an uplink channel (Tx), the channel 4 is switched to a downlink channel (Rx). Therefore, an SRS is sent on one of the antenna 3 and the antenna 4. Therefore, SRSs are sent on two of the four antennas at the same time, and two rounds of sending is needed. This is 2T4R.

Figure 4:
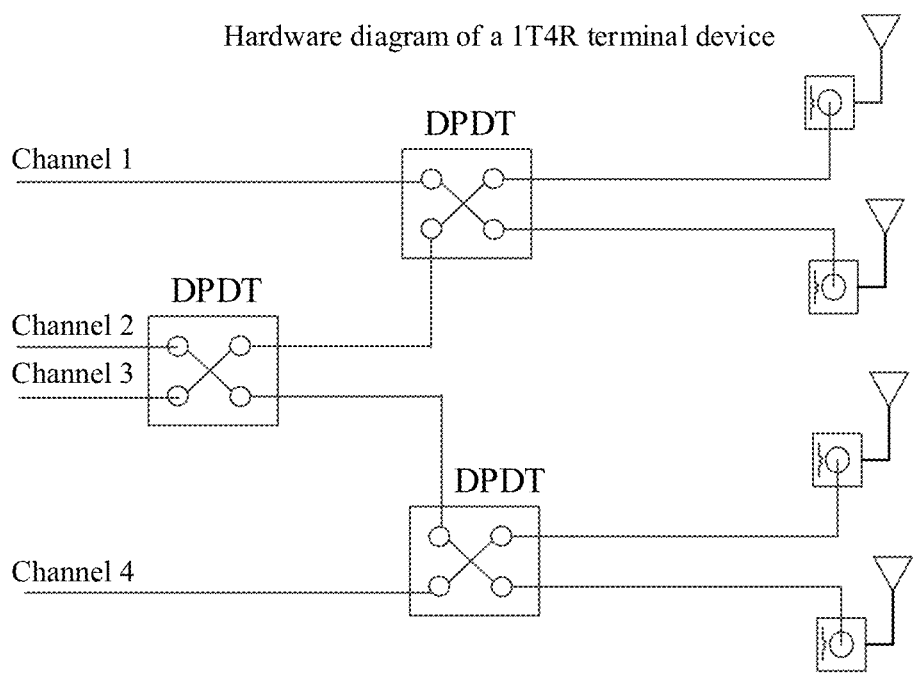
FIG. 4 is a schematic diagram of a structure of a 1T4R terminal device according to an embodiment of this application.

Similarly, 1T4R can be understood as follows: When an SRS can be sent only on one antenna at a same moment, one SRS needs to be sent alternately on each antenna four times. FIG. 4 shows a part of a hardware structure of a terminal device supporting 1T4R. A switch is added on the basis of FIG. 3. Four channels correspond to four antennas. Only one of the four channels is an uplink channel (Tx) at a same moment, and the other three channels are switched to downlink channels (Rx). For example, when a channel 1 is an uplink channel, and the other channels are switched to downlink channels, an SRS is sent on an antenna 1 corresponding to the channel 1. Then, the channel 1 is switched to a downlink channel, a channel 2 is switched to an uplink channel, and a channel 3 and a channel 4 are still downlink channels. In this case, an SRS is sent on an antenna 2 corresponding to the channel 2. Therefore, an SRS is sent on one of the four antennas at a same moment, and four rounds of sending is needed. This is 1T4R.

Figure 5:
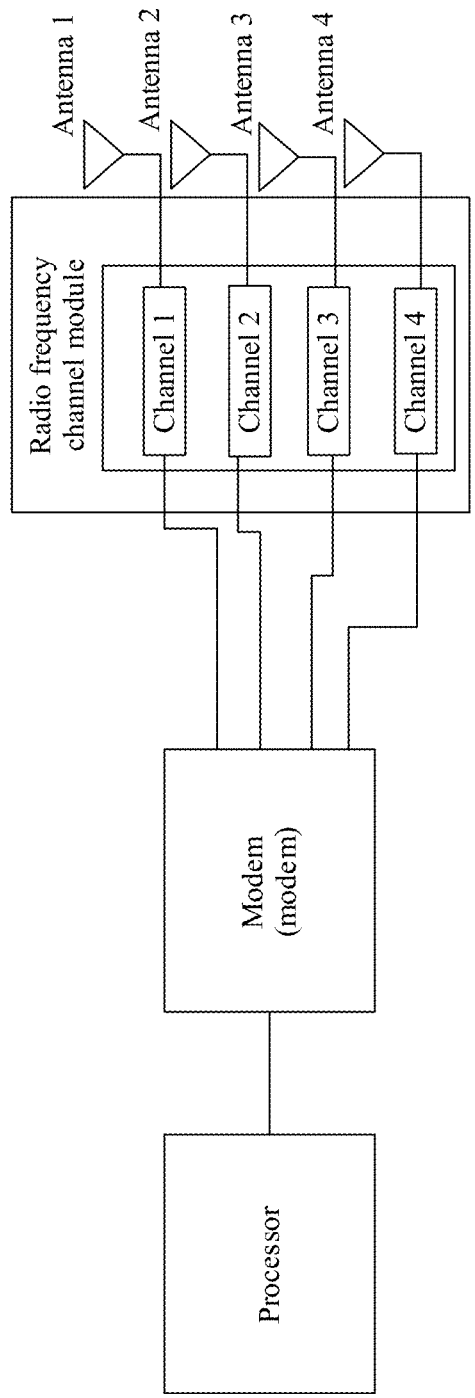
FIG. 5 is a schematic diagram of another structure of a terminal device according to an embodiment of this application.

FIG. 5 is a schematic diagram of a structure of a terminal device according to an embodiment of this application. It should be noted that components shown in FIG. 5 are some components in the terminal device. In actual application, the terminal device may include more or fewer components than those shown in FIG. 5.

As shown in FIG. 5, the terminal device includes a processor, a modem, and a radio frequency channel module. The processor may include one or more processing units. The processor may further integrate an application processor and the modem. The application processor mainly processes an operating system, a user interface, an application, and the like. The modem mainly processes wireless communication, for example, modulates to-be-sent data and demodulates received data. It may be understood that the modem may alternatively not be integrated into the processor. The radio frequency channel module is responsible for receiving and sending data, and may be understood as a transceiver. The terminal device may further include a memory (not shown in the figure), and the memory may be configured to store a software program and data. The processor runs the software program or the data stored in the memory, to perform various functions of the terminal device and process data. Certainly, the terminal device may further include components such as a touchscreen, a microphone, and a loudspeaker, which are not listed one by one herein.

The radio frequency channel module is connected to one or more antennas, and may be configured to receive and send information. The radio frequency channel module includes but is not limited to components such as at least one amplifier, a transceiver, a coupler, a low noise amplifier, and a duplexer. In addition, the radio frequency channel module may further communicate with a network and another device through wireless communication. The wireless communication may use any communication standard or protocol, including but not limited to a global system for mobile communications, a general packet radio service, code division multiple access, wideband code division multiple access, long term evolution, email, a short message service, and the like.

In embodiments of this application, the radio frequency channel module may include four radio frequency channels, that is, a channel 1 to a channel 4 in FIG. 5. In a downlink direction, downlink data received by the antenna is sent to the modem, and the modem demodulates the received downlink data, and sends demodulated data to the processor for processing. When the terminal device receives downlink data, the four channels may receive the downlink data at the same time. In an uplink direction, the processor generates to-be-sent uplink data, and sends the to-be-sent uplink data to the modem. The modem modulates the uplink data, and the modulated data is transmitted by using the radio frequency channel module through the antenna. When the terminal device sends uplink data, only one or two of the four radio frequency channels can send the uplink data.

For example, the terminal device shown in FIG. 5 is a 1T4R terminal device. A process in which the terminal device performs alternating SRS transmission may be as follows: The processor generates four SRSs, and sequentially sends the four SRSs to the modem. The modem sequentially modulates the four SRSs, and the modulated four SRSs are transmitted through the radio frequency channel by using the antenna. For example, at a first moment, the radio frequency channel module controls the channel 1 to be an uplink channel, and the channel 2 to the channel 4 to be downlink channels. In this case, a first modulated SRS is transmitted through the channel 1 by using an antenna 1. At a second moment (a moment after the first moment), the channel 1 is adjusted from the uplink channel to a downlink channel, and the channel 2 is adjusted from the downlink channel to an uplink channel. In this case, a second modulated SRS is transmitted through the channel 2 by using an antenna 2. At a third moment (a moment after the second moment), the channel 2 is adjusted from the uplink channel to the downlink channel, and the channel 3 is adjusted from the downlink channel to an uplink channel. In this case, a third adjusted SRS is transmitted through the channel 3 by using an antenna 3. Then, at a fourth moment (a moment after the third moment), the channel 3 is adjusted from the uplink channel to the downlink channel, and the channel 4 is adjusted from the downlink channel to an uplink channel. In this case, a fourth modulated SRS is transmitted through the channel 4 by using an antenna 4.

It should be noted that the SRS in the foregoing alternating SRS transmission mechanism may be an AS SRS. This is because in NR, the SRS has a plurality of functions, for example:

an antenna switch;
codebook-based transmission;
beam management; and
non-codebook-based transmission.

An SRS having an antenna switch function is referred to as an AS SRS. For a TDD mode, an uplink channel is the same as an uplink channel, and the AS SRS is used to detect a downlink receiving capability of the terminal device. FIG. 1 is used as an example. The terminal device supports simultaneous receiving of downlink data on four antennas. Therefore, AS SRSs need to be sent alternately, to complete detection on downlink receiving capabilities of all antennas. Therefore, the foregoing alternating SRS transmission may be understood as alternating AS SRS transmission.

An SRS having a codebook-based transmission function is referred to as a CB SRS, and is used to evaluate an uplink sending capability of the terminal device. Because the terminal device supports only uplink sending on a single-transmission channel or a dual-transmission channel, a sending capability of a transmit antenna can be evaluated without using all antennas to alternately send CB SRSs provided that the transmit antenna is consistent with a transmit antenna of uplink service data (for example, PUSCH data). For example, when the terminal device needs to send PUSCH data at a moment t1 by using the antenna 1, the terminal device sends a CB SRS at a moment t2 (before the moment t1) by using the antenna 1. The CB SRS is used to evaluate quality of a transmission channel corresponding to the antenna 1. After receiving the CB SRS, a network side device may determine a quality evaluation result of the antenna 1, and the network side device may receive the PUSCH data on the antenna 1 based on the quality evaluation result of the antenna 1. For example, the network side device may obtain a channel quality indicator (CQI) of the terminal device by detecting the CB SRS sent by the terminal device, determine, based on the CQI, a modulation and coding scheme (MSC) level corresponding to an uplink physical channel of the terminal device, determine a modulation/demodulation order based on the MSC level, and demodulate the PUSCH data based on the modulation/demodulation order.

The alternating AS SRS transmission needs antenna switching. FIG. 5 is still used as an example. After sending a first AS SRS by using the antenna 1, the terminal device switches to the antenna 2 to send a second AS SRS by using the antenna 2, then switches to the antenna 3 to send a third AS SRS by using the antenna 3, and then switches to the antenna 4 to send a fourth AS SRS by using the antenna 4.

It should be noted that the terminal device or a network device is provided with four antennas, and the "antenna" is a real antenna or a physical antenna. For the network device, an antenna that is used by the terminal device for transmission cannot be distinguished. Therefore, to facilitate distinguishing by the network device, an antenna port is proposed. For example, each of the four physical antennas of the terminal device corresponds to one antenna port, and the network device distinguishes between different antennas (or channels) by using antenna ports. For example, the terminal device has four physical antennas. A physical antenna 1 corresponds to an antenna port 0, a physical antenna 2 corresponds to an antenna port 1, a physical antenna 3 corresponds to an antenna port 2, and a physical antenna 4 corresponds to an antenna port 3. Therefore, for a receive end such as the network device, different antennas (that is, channels) may be distinguished by using antenna ports, and the channels are evaluated by using reference signals corresponding to the antenna ports. Therefore, the antenna switching described above may also be understood as antenna port switching. For example, the physical antenna 1 corresponds to the antenna port 0, the physical antenna 2 corresponds to the antenna port 1, the physical antenna 3 corresponds to the antenna port 2, and the physical antenna 4 corresponds to the antenna port 3. The physical antenna 1 is switched to the physical antenna 2, that is, the antenna port 0 is switched to the antenna port 1. Similarly, the physical antenna 2 is switched to the physical antenna 3, that is, the antenna port 1 is switched to the antenna port 2.

A manner of configuring UE to perform antenna switching in an existing protocol includes:

When usage in SRS-ResourceSet is configured as antennaSwitching by using a higher layer parameter, the UE supports antenna switching, that is, the UE can send AS SRSs alternately. The protocol lists a plurality of cases. For different cases, the UE can perform antenna switching in corresponding configuration manners. Two cases are listed in this specification:

<Case 1>
1. A maximum quantity of SRS resource sets is 2.
2. In each SRS resource set, two SRS resources (resources) are transmitted in different symbols.
3. Each SRS resource in the SRS resource set includes two SRS ports, and an SRS port of a second SRS resource is associated with a UE antenna port different from that of a first SRS resource.
4. A resourceType in SRS-ResourceSet set is set to configured (aperiodic, semi-persistent, or periodic).

For example, one SRS resource set is used as an example. The SRS resource set includes two SRS resources, namely, a first SRS resource and a second SRS resource. The first SRS resource includes two SRS ports (an SRS port 0 and an SRS port 1), and the second SRS resource includes two SRS ports (an SRS port 0 and an SRS port 1). In other words, there are four SRS ports in total, and each SRS port is associated with (or corresponds to) one antenna port of the UE. For example, refer to Table 1.

TABLE 1

| SRS port | UE antenna port |
| --- | --- |
| SRS port 0 of a first SRS resource | UE antenna port 0 |
| SRS port 1 of the first SRS resource | UE antenna port 1 |
| SRS port 0 of a second SRS resource | UE antenna port 2 |
| SRS port 1 of the second SRS resource | UE antenna port 3 |

<Case 2>
In a given SRS resource set, each SRS resource includes a single SRS port, and an SRS port of each SRS resource is associated with a different UE antenna port. For example, the given SRS resource set includes four SRS resources, namely, a first SRS resource to a fourth SRS resource. Each SRS resource includes a single SRS port. In other words, four SRS ports are included in total. Each SRS port is associated with one antenna port. For example, refer to Table 2.

TABLE 2

| SRS port | UE antenna port |
| --- | --- |
| SRS port 0 of a first SRS resource | UE antenna port 0 |
| SRS port 0 of a second SRS resource | UE antenna port 1 |
| SRS port 0 of a third SRS resource | UE antenna port 2 |
| SRS port 0 of a fourth SRS resource | UE antenna port 3 |

After each SRS port is associated with one antenna port, the terminal device sends an SRS on a physical antenna corresponding to the antenna port. Table 2 is used as an example. It is assumed that four SRS ports corresponding to the four SRS resources respectively correspond to the four antenna ports, and the terminal device sequentially sends SRSs on physical antennas corresponding to the antenna ports. For example, if the antenna port 0 corresponds to a physical antenna 1, a first AS SRS is sent on the physical antenna 1; if the antenna port 1 corresponds to a physical antenna 2, a second AS SRS is sent on the physical antenna 2; if the antenna port 2 corresponds to a physical antenna 3, a third AS SRS is sent on the physical antenna 3; and if the antenna port 3 corresponds to a physical antenna 4, a fourth AS SRS is transmitted on the physical antenna 4.

Figure 6:
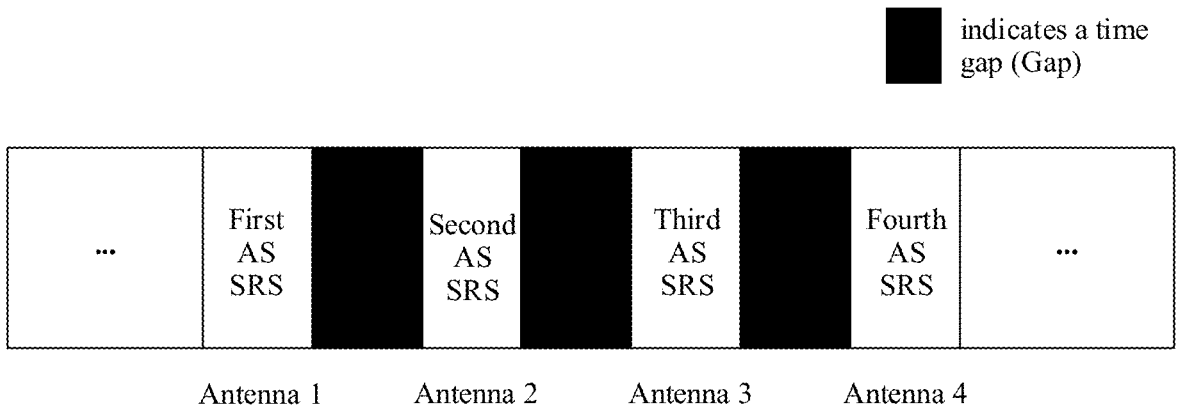
FIG. 6 is a schematic diagram of an alternating SRS transmission mechanism according to an embodiment of this application.

It is specified in the existing protocol that waiting duration is set between two consecutive AS SRSs. For example, as shown in FIG. 6, a first AS SRS corresponds to an antenna 1, a second AS SRS corresponds to an antenna 2, a third AS SRS corresponds to an antenna 3, and a fourth AS SRS corresponds to an antenna 4. A gap is set between a sending moment of the first AS SRS and a sending moment of the second AS SRS, a gap is set between the sending moment of the second AS SRS and a sending moment of the third AS SRS, and a gap is set between the sending moment of the third AS SRS and a sending moment of the fourth AS SRS.

Figure 7:
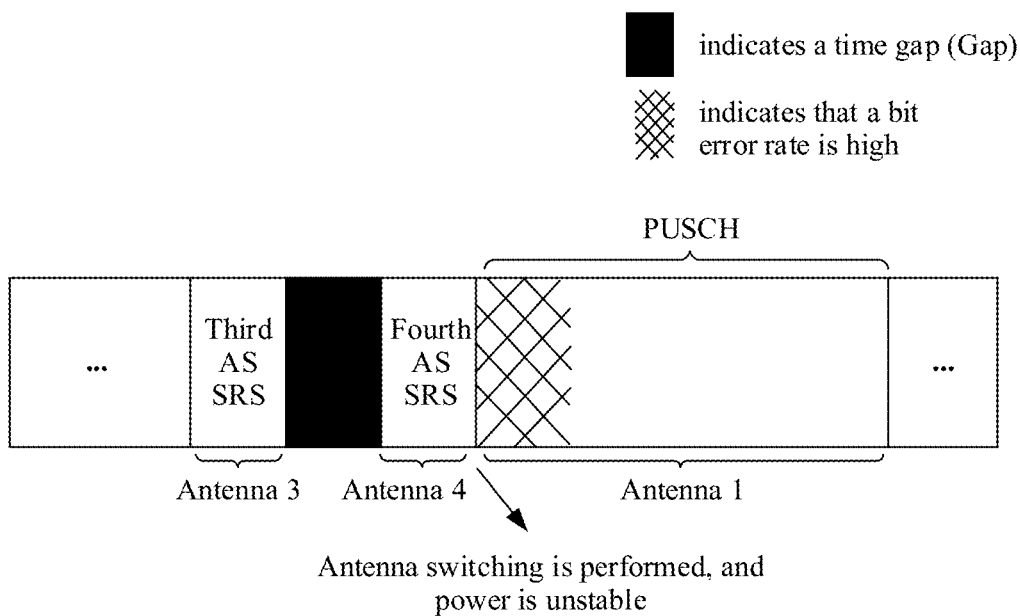
FIG. 7 is a schematic diagram of an alternating SRS transmission mechanism and PUSCH sending in an existing mechanism.

It is further specified in the existing protocol that no waiting duration may be set between an AS SRS and uplink data (for example, PUSCH data). Therefore, there is a possible case: The terminal device needs to switch an antenna when sending the uplink data and the AS SRS. For example, as shown in FIG. 7, after sending of an AS SRS on an antenna 4 is completed, the antenna 4 needs to be switched to an antenna 1 to send PUSCH data.

Because it is specified in the protocol that no waiting duration may be set between the AS SRS and the PUSCH data, a time gap between a time domain resource of the AS SRS and a transmission resource (especially a time domain resource) of the PUSCH does not need to be considered when the transmission resource of the PUSCH is configured. Therefore, there are two possible manners. FIG. 7 is still used as an example. In one manner, after sending a fourth SRS on the antenna 4, the terminal device immediately switches to the antenna 1 to send the PUSCH data. In this case, a problem of a high PUSCH bit error rate occurs due to unstable power (because the antenna switching needs power stability duration), and accuracy of the PUSCH data received by a receive end such as a network side device is low. In another manner, after sending the fourth SRS on the antenna 4, the terminal device waits for sufficient power stability duration, and after the power stability duration, switches to the antenna 1 to send the PUSCH data. As a result, some information in the PUSCH data is not immediately sent because a configured sending time point is missed, and accuracy of the PUSCH data received by the receive end is low.

A current solution is as follows: When an SRS is configured on a network side, an SRS whose sending time point is close to a sending time point of PUSCH data is configured as a CB SRS instead of an AS SRS. For a function of the CB SRS, refer to the foregoing descriptions. Because it is specified in a protocol that a same transmit antenna needs to be used for the CB SRS and the PUSCH data, antenna switching is not needed between the CB SRS and the PUSCH. Therefore, a bit error rate of the PUSCH data is low. However, in this manner, a requirement for a network side is high, a resource location of the CB SRS is limited, and practicability is low.

Another solution is as follows: To reduce a bit error rate, a receive end such as a network device performs order reduction processing on received PUSCH data, that is, demodulates the received PUSCH data by using a lower modulation/demodulation order, to reduce the bit error rate. Although the order reduction processing increases the bit error rate to some extent, a high bit error rate cannot be ensured.

In view of this, an embodiment of this application provides a data sending method. In the method, an AS SRS and uplink data whose sending time points are close to each other are associated with a same transmit antenna, to avoid a high PUSCH bit error rate caused by antenna switching. The uplink data includes but is not limited to PUSCH data, PUCCH data, PRACH data, and the like. A PUSCH is mainly used as an example in this specification.

An AS SRS and PUSCH data whose sending time points are close to each other may be understood as follows: A time difference between a first sending time point of the AS SRS and a second sending time point of the PUSCH data is less than or equal to a threshold, and the threshold is less than power stability duration needed when a terminal device switches an antenna. For example, the threshold is 0 microseconds, 15 microseconds, or any duration between 10 microseconds and 15 microseconds.

The first sending time point and the second sending time point may be configured by a network device. For example, a process of configuring the first sending time point of the AS SRS may be as follows: The network device configures an SRS resource set, which may include four SRS resources: a first SRS resource to a fourth SRS resource. Each SRS resource includes one time domain resource. It is assumed that the first SRS resource includes a first time domain resource of a first AS SRS, the second SRS resource includes a time domain resource of a second AS SRS, the third SRS resource includes a time domain resource of a third AS SRS, and the fourth SRS resource includes a time domain resource of a fourth AS SRS. Therefore, the terminal device may determine that a location of a time domain resource of each of the four AS SRSs is a sending time point. After the network device configures a second time domain resource of the PUSCH for the terminal device, the terminal device may determine which AS SRS in the four AS SRSs has a time domain resource location close to a second time domain resource location of the PUSCH.

That transmit antennas are the same may be understood as: sending is performed on a same physical antenna, and antenna ports corresponding to the same physical antenna are the same. For example, the terminal device has four physical antennas, and each physical antenna corresponds to one antenna port. It is assumed that a physical antenna 1 corresponds to an antenna port 0, a physical antenna 2 corresponds to an antenna port 1, a physical antenna 3 corresponds to an antenna port 2, and a physical antenna 4 corresponds to an antenna port 3. That transmit antennas of the AS SRS and the PUSCH data are the same may be as follows: the transmit antennas of both the AS SRS and the PUSCH data are the physical antenna 1 and correspond to the antenna port 0; or the transmit antennas of both the AS SRS and the PUSCH data are the physical antenna 2 and correspond to the antenna port 1; or the transmit antennas of both the AS SRS and the PUSCH data are the physical antenna 3 and correspond to the antenna port 2; or the transmit antennas of both the AS SRS and the PUSCH data are the physical antenna 4 and correspond to the antenna port 3.

In embodiments of this application, the terminal device may adjust, based on three adjustment policies, transmit antennas of an AS SRS and PUSCH data to be the same, and sending time points of the AS SRS and the PUSCH data to be close to each other.

The following describes a first adjustment policy.

According to the first adjustment policy, for an AS SRS and PUSCH data whose sending time points are close to each other, a transmit antenna of the AS SRS may be adjusted, to enable an adjusted transmit antenna of the AS SRS to be consistent with a transmit antenna of the PUSCH data. In other words, according to the first adjustment policy, the transmit antenna of the PUSCH may not be adjusted. For example, when a sending time point of a first AS SRS in four AS SRSs is close to a sending time point of a PUSCH, if a transmit antenna of the first AS SRS is not consistent with a transmit antenna of the PUSCH, the transmit antenna of the first AS SRS is adjusted, to enable the transmit antenna of the first AS SRS to be consistent with the transmit antenna of the PUSCH, to avoid a high PUSCH bit error rate caused by antenna switching.

The following lists several examples of the first adjustment policy.

Example 1

Figure 8:
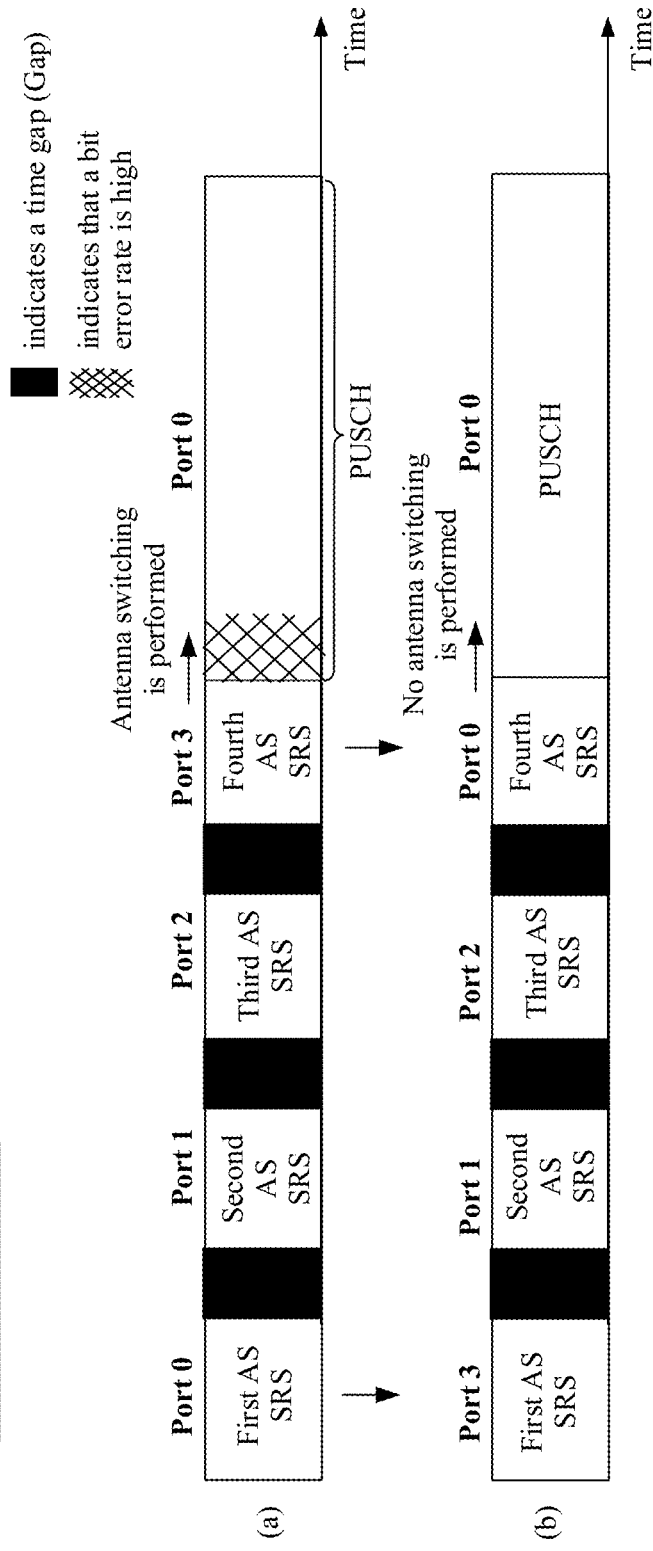
FIG. 8 is a schematic diagram of Example 1 of a first policy according to an embodiment of this application.

FIG. 8 is a schematic diagram of Example 1 of the first adjustment policy. (a) in FIG. 8 shows a configuration of transmit antennas of four AS SRSs and a PUSCH in an existing mechanism. Because a sequence of antenna ports corresponding to the four AS SRSs is not specified in an existing protocol, allocation is usually performed in sequence. For example, a first AS SRS corresponds to an antenna port 0, a second AS SRS corresponds to an antenna port 1, a third AS SRS corresponds to an antenna port 2, and a fourth AS SRS corresponds to an antenna port 3. Usually, the PUSCH corresponds to the antenna port 0 by default. In this case, an AS SRS whose sending time point is close to a sending time point of the PUSCH is the fourth AS SRS and corresponds to the antenna port 3, and the PUSCH corresponds to the antenna port 0. Therefore, antenna switching needs to be performed between the fourth AS SRS and the PUSCH, resulting in a high PUSCH bit error rate.

In an embodiment of the application, the terminal device may adjust antenna ports corresponding to the four AS SRSs. For example, an antenna port corresponding to the first AS SRS is exchanged with an antenna port corresponding to the fourth AS SRS. To be specific, the first AS SRS corresponds to the antenna port 3, and the fourth AS SRS corresponds to the antenna port 0. In this case, antenna ports corresponding to the PUSCH and the fourth AS SRS are consistent, as shown in (b) in FIG. 8. In this way, antenna switching does not need to be performed between the fourth AS SRS and the PUSCH. This avoids a high PUSCH bit error rate caused by antenna switching.

In this example, as long as it is ensured that the fourth AS SRS is the antenna port 0, antenna ports corresponding to the other three AS SRSs may be flexibly adjusted. This is not limited in an embodiment of the application. For example, the first AS SRS corresponds to the antenna port 1, the second AS SRS corresponds to the antenna port 2, the third AS SRS corresponds to the antenna port 3, and the fourth AS SRS corresponds to the antenna port 0.

Example 2

In this example, four AS SRSs are allocated to two different slots, and a PUSCH resource location is configured in each slot. Therefore, there is a case: In each slot, an AS SRS whose sending time point is close to a sending time point of a PUSCH exists.

Figure 9:
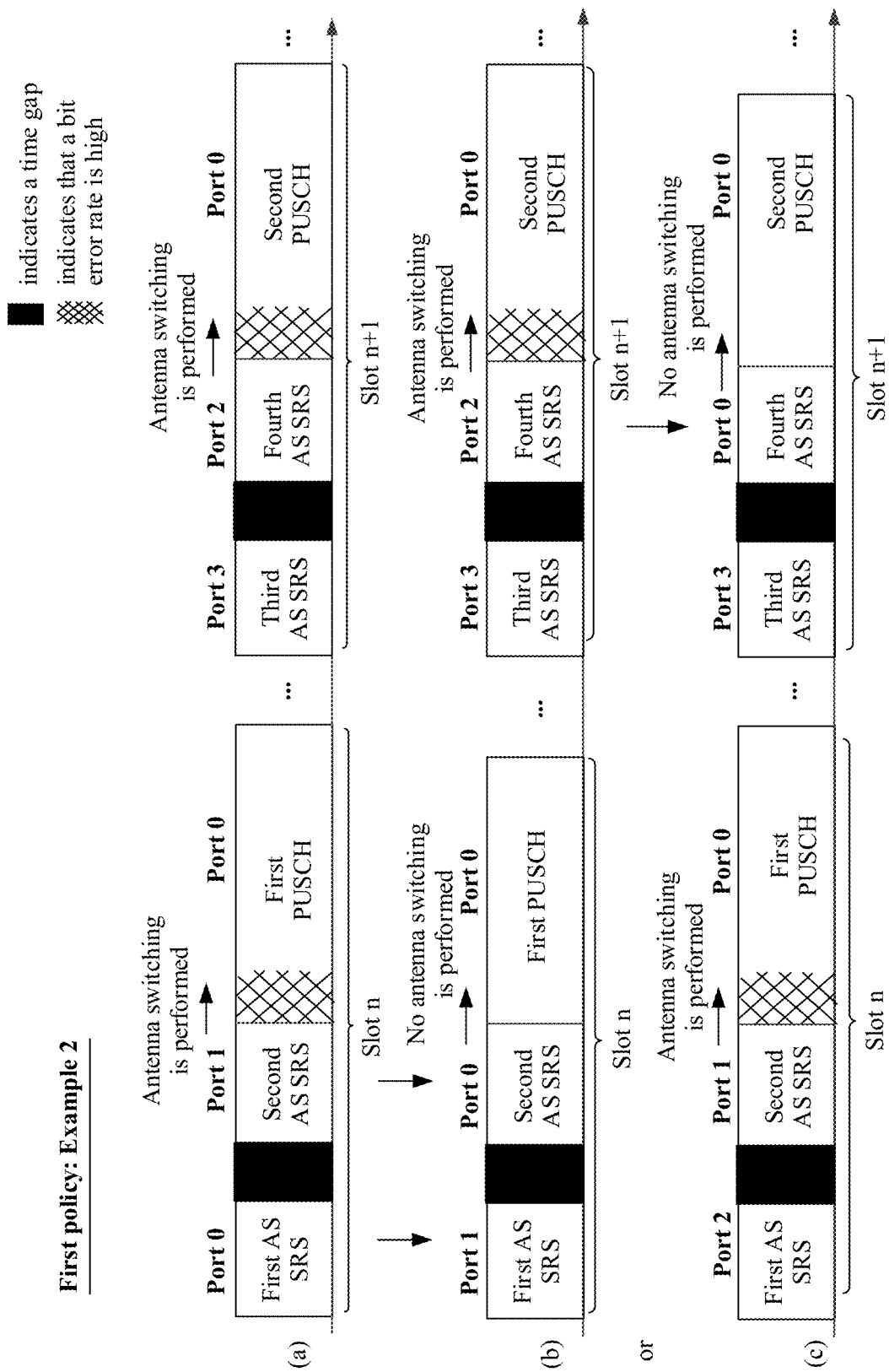
FIG. 9 is a schematic diagram of Example 2 of a first policy according to an embodiment of this application.

As shown in (a) in FIG. 9, there are two AS SRSs in a slot n: a first AS SRS and a second AS SRS, where a sending time point of the second AS SRS is close to a sending time point of a first PUSCH. There are two AS SRSs in a slot n+1: a third AS SRS and a fourth AS SRS, where a sending time point of the fourth AS SRS is close to a sending time point of a second PUSCH. In an existing mechanism, antenna ports are allocated to the four AS SRSs in sequence. For example, the first AS SRS corresponds to an antenna port 0, the second AS SRS corresponds to an antenna port 1, the third AS SRS corresponds to an antenna port 2, and the fourth AS SRS corresponds to an antenna port 3. The first PUSCH and the second PUSCH correspond to the antenna port 0 by default. Therefore, the antenna port of the second AS SRS is not consistent with that of the second PUSCH, and the antenna port of the fourth AS SRS is not consistent with that of the second PUSCH.

In this case, in a manner, as shown in (b) in FIG. 9, the terminal device exchanges antenna ports corresponding to the first AS SRS and the second AS SRS in the slot n, that is, adjusts a port corresponding to the first AS SRS from the antenna port 0 to the antenna port 1, and adjusts an antenna port corresponding to the second AS SRS from the antenna port 1 to the antenna port 0. In this way, an adjusted antenna port of the second AS SRS is consistent with the antenna port of the first PUSCH. Because the second AS SRS in the slot n already occupies the antenna port 0, an antenna port corresponding to the fourth AS SRS in the slot n+1 cannot be adjusted as the antenna port 0, and antenna ports corresponding to the third AS SRS and the fourth AS SRS may remain unchanged. Alternatively, the second AS SRS corresponds to the antenna port 0, and antenna ports corresponding to the first AS SRS, the third AS SRS, and the fourth AS SRS may be flexibly adjusted.

In another manner, different from the manner in (b) in FIG. 9, in (c) in FIG. 9, the terminal device adjusts an antenna port corresponding to the fourth AS SRS from the port 2 to the port 0, and adjusts, as the port 2, a port of the first AS SRS that originally corresponds to the antenna port 0. In other words, antenna ports corresponding to the fourth AS SRS and the first AS SRS are exchanged with each other. In this way, an adjusted antenna port of the fourth AS SRS is consistent with the antenna port of the second PUSCH. Because the fourth AS SRS in the slot n+1 already occupies the antenna port 0, an antenna port corresponding to the second AS SRS cannot be adjusted as the antenna port 0, and antenna ports corresponding to the second AS SRS and the third AS SRS may remain unchanged. Alternatively, the fourth AS SRS is corresponding to the antenna port 0, and antenna ports corresponding to the first AS SRS, the second AS SRS, and the third AS SRS may be flexibly adjusted.

In Example 2, the four AS SRSs are configured in two different slots, and two AS SRSs are configured in each slot. In actual application, it may alternatively be that four AS SRSs are configured in two different slots, one of the four AS SRSs is configured in one slot, and the other three AS SRSs are configured in the other slot, that is, Example 3 shown below.

Example 3

In this example, four AS SRSs are allocated to two different slots, one AS SRS is configured in one slot, the other three AS SRSs are configured in the other slot, and a PUSCH is configured in each slot. Therefore, there is a case: In each slot, an AS SRS whose sending time point is close to a sending time point of a PUSCH exists.

Figure 10:
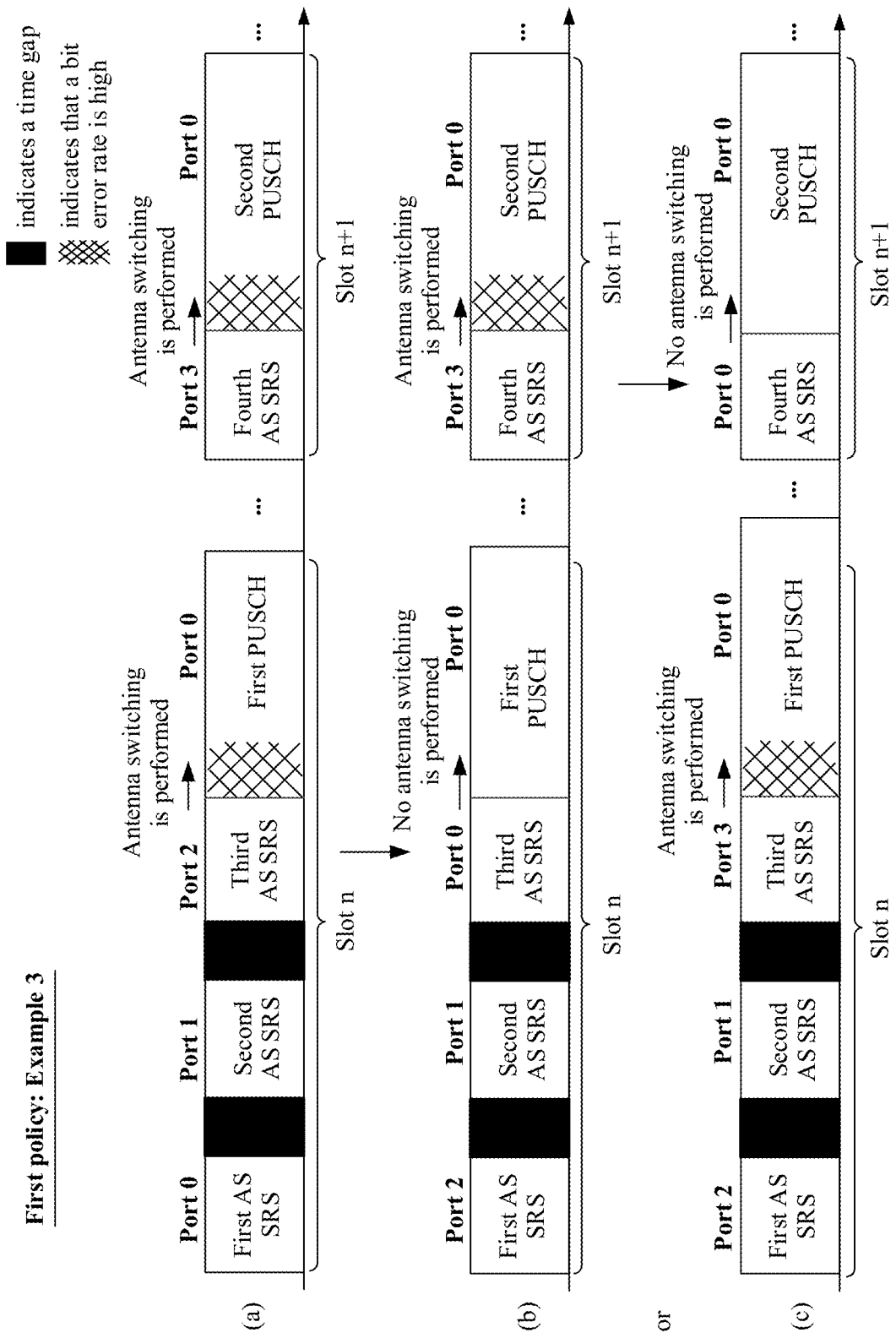
FIG. 10 is a schematic diagram of Example 3 of a first policy according to an embodiment of this application.

As shown in (a) in FIG. 10, there are three AS SRSs in a slot n: a first AS SRS, a second AS SRS, and a third AS SRS, where a sending time point of the third AS SRS is close to a sending time point of a first PUSCH. There is one AS SRS in a slot n+1, namely, a fourth AS SRS, where a sending time point of the fourth AS SRS is close to a sending time point of a second PUSCH. In an existing mechanism, ports are allocated to the four AS SRSs in sequence. For example, the first AS SRS corresponds to an antenna port 0, the second AS SRS corresponds to an antenna port 1, the third AS SRS corresponds to an antenna port 2, and the fourth AS SRS corresponds to an antenna port 3. The first PUSCH and the second PUSCH correspond to the antenna port 0 by default. Therefore, the antenna port of the third AS SRS is not consistent with that of the first PUSCH, and the antenna port of the fourth AS SRS is not consistent with that of the second PUSCH.

In this case, in a manner, as shown in (b) in FIG. 10, the terminal device adjusts the antenna port of the third AS SRS in the slot n as the antenna port 0, and antenna ports of the first AS SRS, the second AS SRS, and the fourth AS SRS may be flexibly adjusted. For example, an antenna port corresponding to the first AS SRS is adjusted from the port 0 to the port 1, and antenna ports corresponding to the second AS SRS and the fourth AS SRS remain unchanged. Because the second AS SRS in the slot n already occupies the antenna port 0, an antenna port corresponding to the fourth AS SRS in the slot n+1 cannot be adjusted as the antenna port 0.

In another manner, different from the manner in (b) in FIG. 10, in (c) in FIG. 10, the terminal device adjusts an antenna port corresponding to the fourth AS SRS from the port 3 to the port 0, and ports corresponding to the other AS SRSs may be flexibly adjusted. For example, a port of the first AS SRS that originally corresponds to the antenna port 0 is adjusted as the port 2. In other words, ports corresponding to the fourth AS SRS and the first AS SRS are exchanged with each other. Antenna ports corresponding to the second AS SRS and the third AS SRS may remain unchanged. In this way, an adjusted antenna port of the fourth AS SRS is consistent with the antenna port of the second PUSCH. Because the fourth AS SRS in the slot n+1 already occupies the antenna port 0, an antenna port corresponding to the third AS SRS cannot be adjusted as the antenna port 0.

The following describes a second adjustment policy.

According to the second adjustment policy, for an AS SRS and PUSCH data whose sending time points are close to each other, a transmit antenna of a PUSCH is adjusted, to enable an adjusted transmit antenna of the PUSCH to be consistent with a transmit antenna of the AS SRS. In other words, according to the second adjustment policy, the transmit antenna of the AS SRS may not be adjusted. For example, when a sending time point of a first AS SRS in four AS SRSs is close to a sending time point of a PUSCH, if a transmit antenna of the first AS SRS is not consistent with a transmit antenna of the PUSCH, the transmit antenna of the PUSCH is adjusted, so that the transmit antenna of the PUSCH is consistent with the transmit antenna of the first AS SRS, to avoid antenna switching.

The following lists several examples of the second adjustment policy.

Example 4

Figure 11:
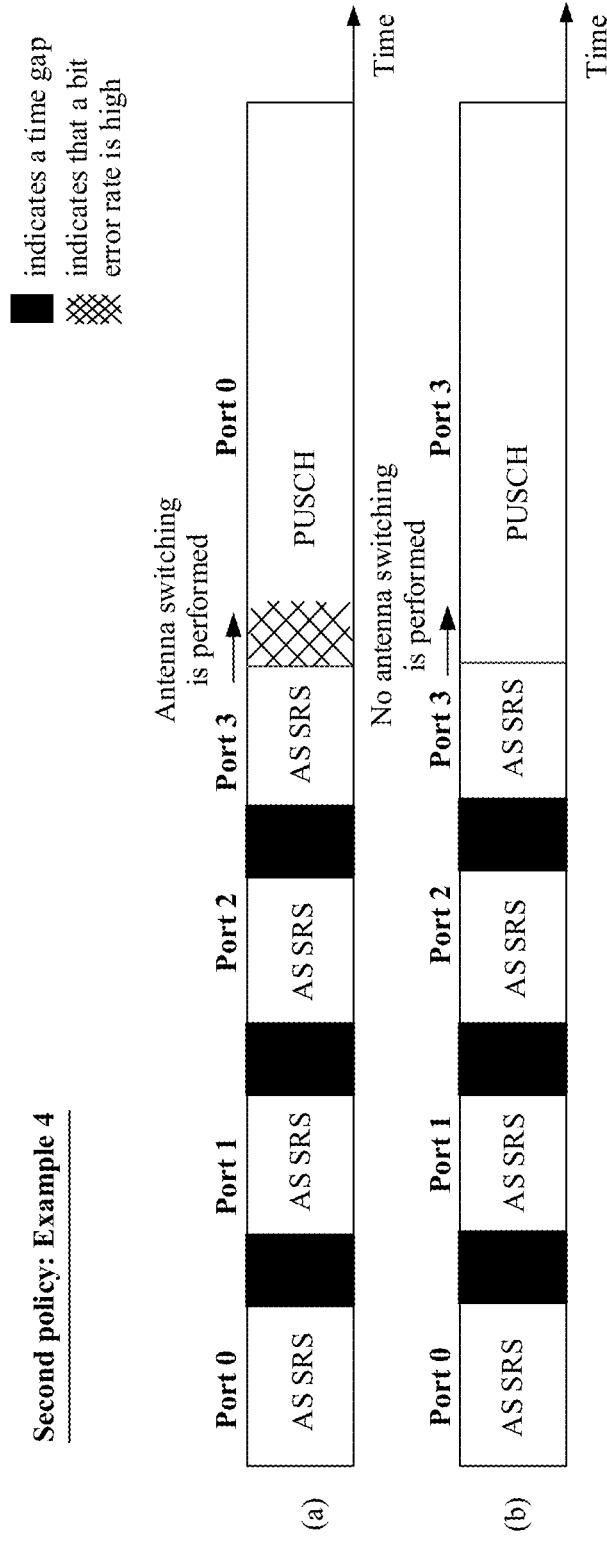
FIG. 11 is a schematic diagram of Example 1 of a second policy according to an embodiment of this application.

As shown in (a) in FIG. 11, four AS SRSs are respectively associated with an antenna port 0 to an antenna port 3, and a sending time point of a fourth AS SRS is close to a transmit antenna of a PUSCH. The PUSCH corresponds to the antenna port 0 by default. Therefore, the antenna port corresponding to the fourth AS SRS is not consistent with the antenna port corresponding to the PUSCH. As shown in (b) in FIG. 11, the terminal device adjusts an antenna port of the PUSCH from the port 0 to the port 3. In this way, both the antenna port of the fourth AS SRS and the antenna port of the PUSCH are the port 3, and antenna switching is not needed. This avoids a high bit error rate caused by antenna switching.

Example 4 is different from Example 1 described above. In Example 1, the terminal device adjusts the antenna port of the fourth AS SRS, to enable the antenna port of the fourth AS SRS to be consistent with the antenna port of the PUSCH. In Example 4, the terminal device adjusts the antenna port of the PUSCH, to enable the antenna port of the PUSCH to be consistent with the antenna port of the fourth AS SRS.

Example 5

In this example, four AS SRSs are respectively allocated to four different slots, one AS SRS is configured in one slot, and a PUSCH is configured in each slot. Therefore, in each slot, an AS SRS whose sending time point is close to a sending time point of a PUSCH exists.

Figure 12:
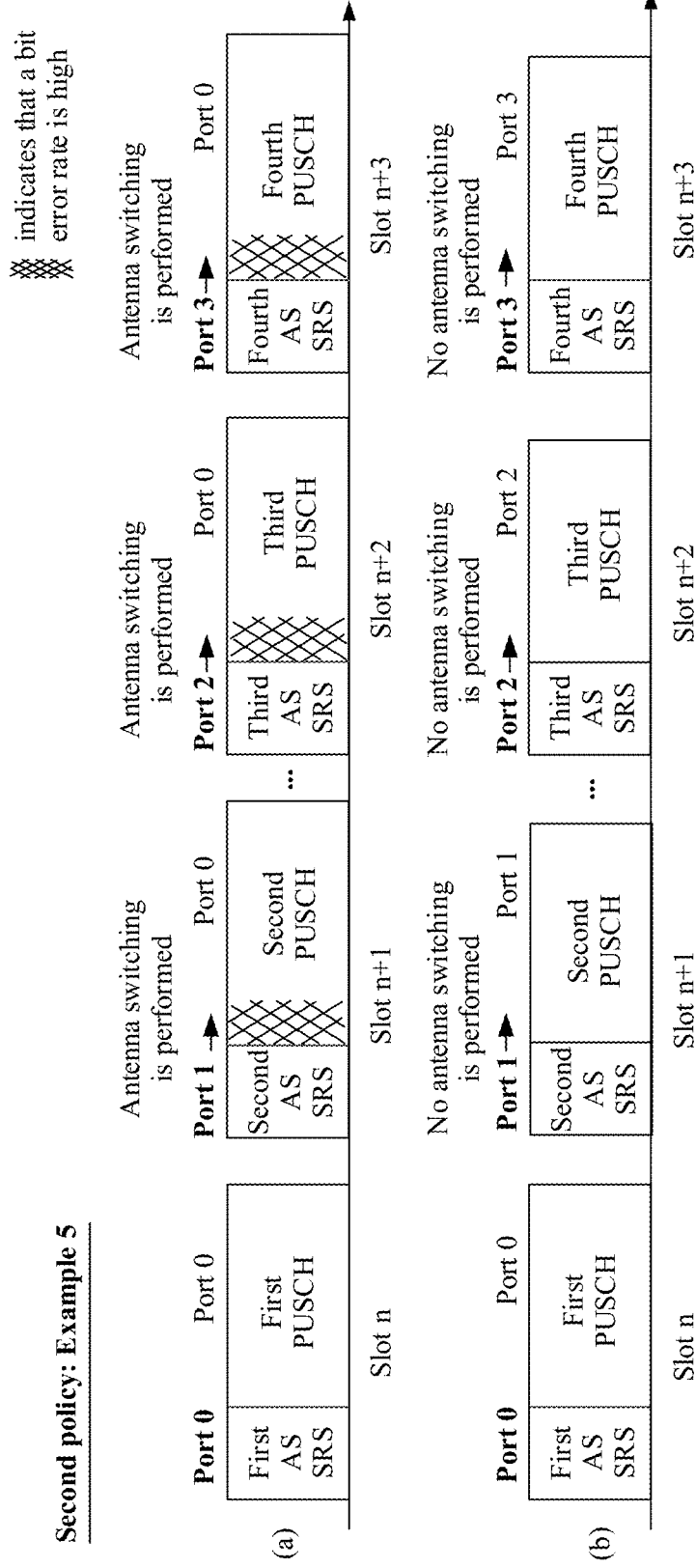
FIG. 12 is a schematic diagram of Example 2 of a second policy according to an embodiment of this application.

As shown in (a) in FIG. 12, in a slot n, a sending time point of a first AS SRS is close to a sending time point of a first PUSCH, and antenna ports of the first AS SRS and the first PUSCH are the same. In a slot n+1, a sending time point of a first AS SRS is close to a sending time point of a first PUSCH, and antenna ports of the first AS SRS and the first PUSCH are the same. Similar conditions occur in a slot n+2 and a slot n+3.

As shown in (b) in FIG. 12, the terminal device adjusts the antenna port of the second PUSCH in the slot n+1 from a port 0 to a port 1, to enable the antenna port of the second AS SRS to be consistent with the antenna port of the second PUSCH; and/or the terminal device adjusts an antenna port of a third PUSCH in the slot n+2 from the port 0 to a port 2, to enable an antenna port of a third AS SRS to be consistent with the antenna port of the third PUSCH; and/or the terminal device adjusts an antenna port of a fourth PUSCH in the slot n+3 from the port 0 to a port 3, to enable the antenna port of a fourth AS SRS to be consistent with the antenna port of the fourth PUSCH.

It should be noted that, in FIG. 12, an example in which four AS SRSs are configured in four different slots is used. In some other embodiments, four AS SRSs may be configured in two slots or three slots. For example, four AS SRSs are configured in two slots, and an AS SRS whose sending time point is close to a sending time point of a PUSCH exists in each slot. In this case, the terminal device may adjust the PUSCH, to enable a port of the PUSCH to be consistent with a port of an AS SRS whose sending time point is close to the sending time point of the PUSCH.

A CB SRS needs to use a same transmit antenna as PUSCH. Therefore, after a port of the PUSCH is adjusted, a port of the CB SRS may also be adjusted to be consistent with the port of the PUSCH. For example, in FIG. 12, after the antenna port of the second PUSCH in the slot n+1 is adjusted from the port 0 to the port 1, an antenna port of a CB SRS (not shown in the figure) in the slot n+1 is also adjusted as the port 1, where a sending time point of the CB SRS in the slot n+1 is before a sending time point of the second PUSCH. In this way, antenna ports of the CB SRS and the PUSCH in the slot n+1 are consistent with each other, and a network side device may evaluate quality of a transmission channel of the antenna port 1 based on the CB SRS, and receive the second PUSCH data based on a quality evaluation result. For details, refer to the foregoing descriptions of the CB SRS function.

FIG. 12 is still used as an example. In an embodiment, considering that the antenna port 0 is used for the CB SRS and the PUSCH by default, in a slot after the slot n+3, an antenna port corresponding to the PUSCH is restored to the antenna port 0, and an antenna port corresponding to the CB SRS is also restored to the antenna port 0.

The following describes a third adjustment policy.

The third adjustment policy is a combination of the first adjustment policy and the second adjustment policy, and may be understood as adjustment based on both the first adjustment policy and the second adjustment policy.

The following lists several examples of the third adjustment policy.

Example 6

Figure 13:
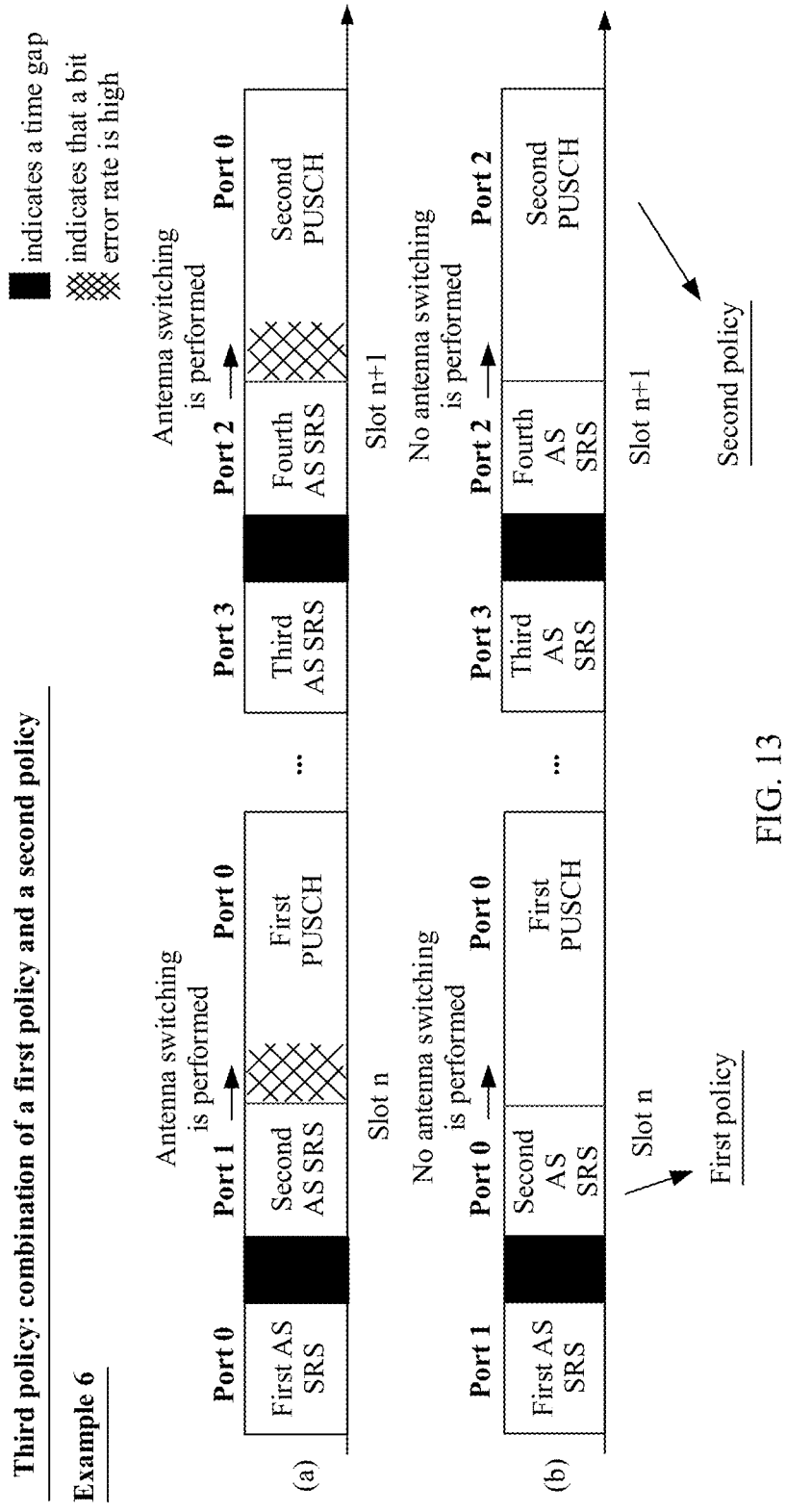
FIG. 13 is a schematic diagram of Example 1 of a third policy according to an embodiment of this application.

As shown in FIG. 13, there are two AS SRSs in a slot n: a first AS SRS and a second AS SRS, where a sending time point of the second AS SRS is close to a sending time point of a first PUSCH. There are two AS SRSs in a slot n+1: a third AS SRS and a fourth AS SRS, where a sending time point of the fourth AS SRS is close to a sending time point of a second PUSCH.

For the slot n, the terminal device may adjust, according to the first adjustment policy, a port corresponding to the second AS SRS from a port 1 to a port 0. In this way, the port of the second AS SRS is consistent with a port of the first PUSCH. Correspondingly, a port of the first AS SRS is adjusted from the port 0 to the port 1. Alternatively, a port corresponding to the second AS SRS is adjusted from a port 1 to a port 0, and ports corresponding to the other three AS SRSs may be flexibly adjusted.

Because the port 0 is already occupied by the second AS SRS, a port of the fourth AS SRS cannot be adjusted as the port 0. Therefore, for the slot n+1, the terminal device may perform adjustment according to the second adjustment policy, that is, adjust a port of the second PUSCH to be consistent with the port of the fourth AS SRS. For example, when the fourth AS SRS corresponds to the port 2, the port of the second PUSCH is adjusted as the port 2.

In the foregoing example, the first adjustment policy is used for the slot n, and the second adjustment policy is used for the slot n+1. In this way, it can be ensured that in each slot, a port corresponding to an AS SRS whose sending time point is close to a sending time point of a PUSCH is consistent with a port corresponding to the PUSCH. Alternatively, the second adjustment policy may be used for the slot n, and the first adjustment policy may be used for the slot n+1. This is not limited in an embodiment of the application.

Example 7

Figure 14:
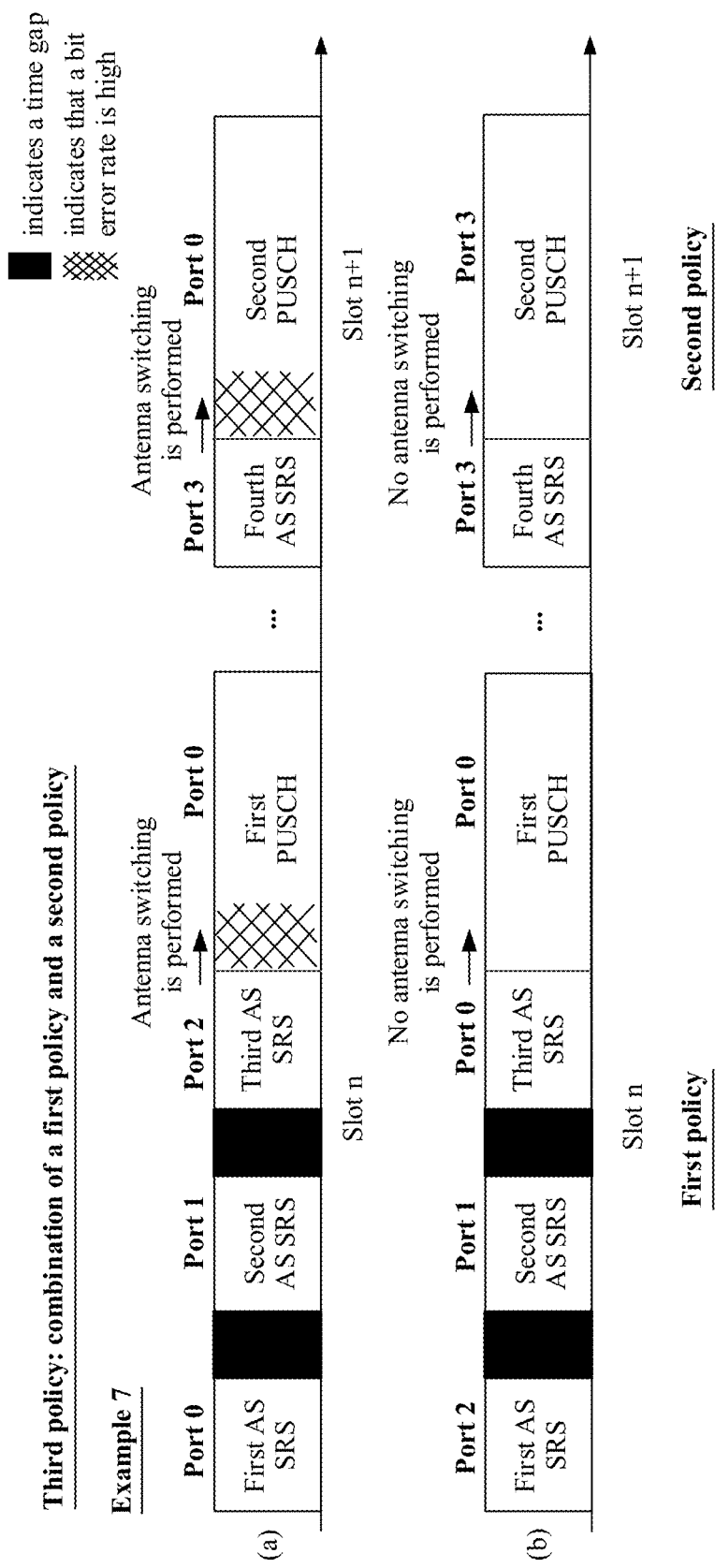
FIG. 14 is a schematic diagram of Example 2 of a third policy according to an embodiment of this application.

As shown in FIG. 14, there are three AS SRSs in a slot n: a first AS SRS, a second AS SRS, and a third AS SRS, where a sending time point of the third AS SRS is close to a sending time point of a first PUSCH. There is one AS SRS in a slot n+1, namely, a fourth AS SRS, where a sending time point of the fourth AS SRS is close to a sending time point of a second PUSCH.

The terminal device adjusts, according to the first adjustment policy, a port corresponding to the third AS SRS from a port 2 to a port 0. In this way, the port of the third AS SRS is consistent with a port of the first PUSCH. After the port corresponding to the third AS SRS is adjusted as the port 0, the other three AS SRSs may be flexibly adjusted. For example, a port of the first AS SRS is adjusted as the port 2, and ports of the second AS SRS and the fourth AS SRS remain unchanged.

Because the port 0 is already occupied by the third AS SRS, a port of the fourth AS SRS cannot be adjusted as the port 0. Therefore, for the slot n+1, the terminal device may perform adjustment according to the second adjustment policy, that is, adjust a port of the second PUSCH to be consistent with the port of the fourth AS SRS. Assuming that the fourth AS SRS corresponds to a port 3, the port of the second PUSCH is adjusted as a port 4.

Alternatively, the second adjustment policy may be used for the slot n, and the first adjustment policy may be used for the slot n+1. This is not limited in an embodiment of the application.

Figure 15:
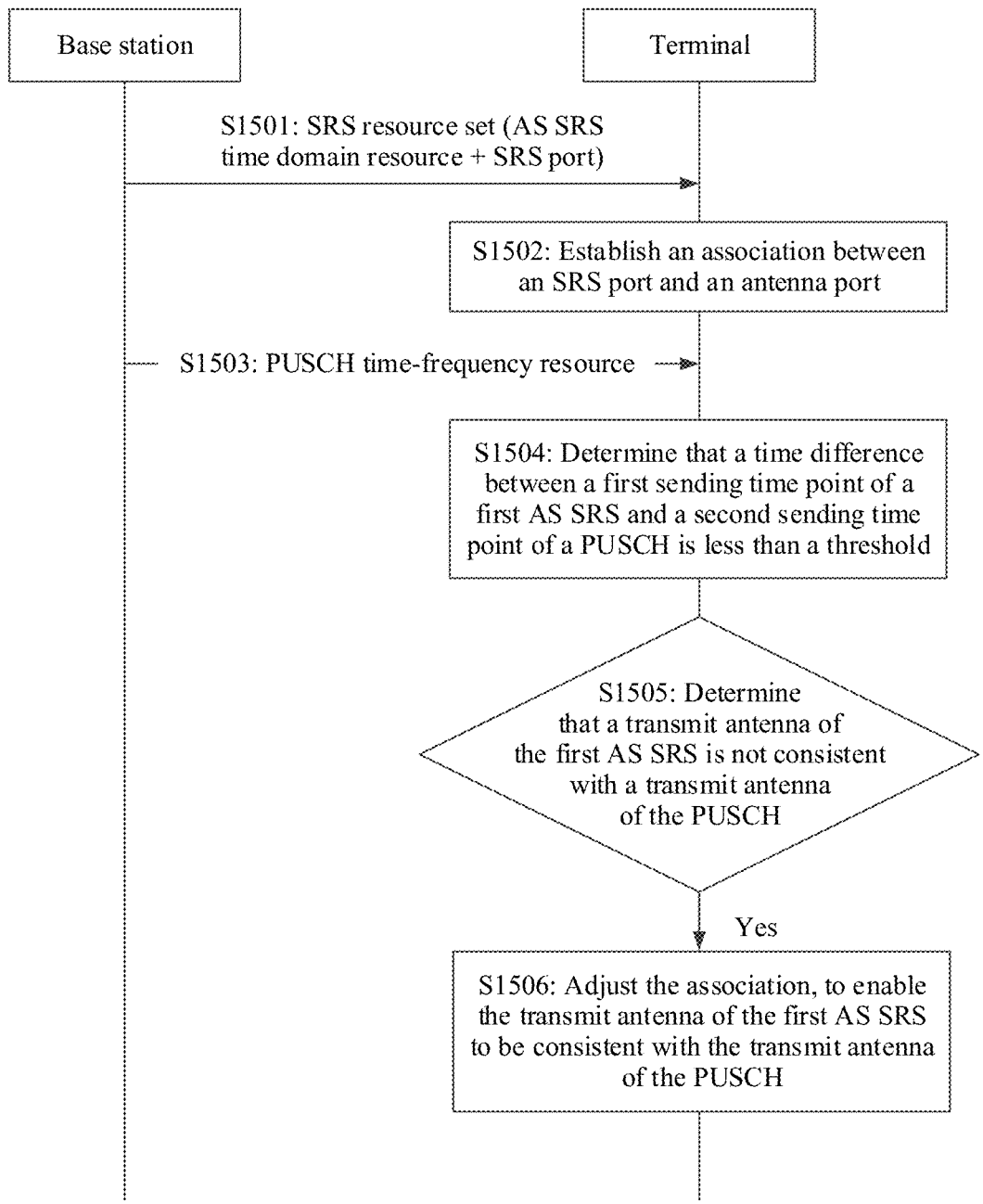
FIG. 15 is a schematic flowchart of a data sending method according to an embodiment of this application.

FIG. 15 is a schematic flowchart of a communication method according to an embodiment of this application. The method may be applied to the application scenario shown in FIG. 1. FIG. 15 may also be understood as a schematic diagram of information exchange between a terminal device and a network device. As shown in FIG. 15, a procedure of the method includes the following operations:

S1501: A network device sends an SRS resource set to a terminal device, where the SRS resource set includes an AS SRS resource.

Before S1501, the network device may configure usage in SRS-ResourceSet as "antennaSwitching" by using a higher layer parameter (for example, RRC signaling), to notify the terminal device that alternating AS SRS transmission can be performed. In this case, the SRS resource set configured by the network device includes the AS SRS resource. The network device configures the SRS resource set in a plurality of manners, for example, at least one of the following manners:

Manner 1

1. A maximum quantity of SRS resource sets is 2.
2. In each SRS resource set, two SRS resources are transmitted in different symbols.
3. Each SRS resource in the SRS resource set includes a single SRS port, and an SRS port of a second SRS resource in a set is associated with a UE antenna port different from that of a first SRS resource in the same set.
4. A resourceType in SRS-ResourceSet set is set to configured (aperiodic, semi-persistent, or periodic).

For example, refer to Table 3.

TABLE 3

| SRS resource set | SRS resource | SRS port |
|---|---|---|
| Set 1 | SRS resource 1 | SRS port 0 |
|  | SRS resource 2 | SRS port 0 |
| Set 2 | SRS resource 3 | SRS port 0 |
|  | SRS resource 4 | SRS port 0 |

Although not shown in Table 3, each SRS resource may further include a time-frequency resource location corresponding to the SRS. For example, the SRS resource 1 includes an SRS sending time point 1 and a frequency domain location 1; the SRS resource 2 includes an SRS sending time point 2 and a frequency domain location 2; the SRS resource 3 includes an SRS sending time point 3 and a frequency domain location 3; and the SRS resource 4 includes an SRS sending time point 4 and a frequency domain location 4.

Manner 2

1. A maximum quantity of SRS resource sets is 2.
2. In each SRS resource set, two SRS resources are transmitted in different symbols.
3. Each SRS resource in the SRS resource set includes two SRS ports, and an SRS port pair of a second SRS resource and an SRS port pair of a first SRS resource are associated with different UE antenna ports.
4. A resourceType in SRS-ResourceSet set is set to configured (aperiodic, semi-persistent, or periodic).

For example, refer to Table 4.

TABLE 4

| SRS resource set | SRS resource | SRS port |
|---|---|---|
| Set 1 | SRS resource 1 | SRS port 0 |
|  |  | SRS port 1 |
|  | SRS resource 2 | SRS port 0 |
|  |  | SRS port 1 |

Each SRS resource may further include a time-frequency resource location corresponding to the SRS.

Manner 3
1. Quantity of SRS resource sets is equal to 0 or 1.
2. In each SRS resource set, four SRS resources are transmitted in different symbols.
3. Each SRS resource in the SRS resource set includes a single SRS port, and an SRS port of each resource is associated with a different UE antenna port.
4. A resourceType in SRS-ResourceSet set is set to configured (periodic, or semi-persistent).
For example, refer to Table 5.

TABLE 5

| SRS resource set | SRS resource | SRS port |
|---|---|---|
| Set 1 | SRS resource 1 | SRS port 0 |
| | SRS resource 2 | SRS port 0 |
| | SRS resource 3 | SRS port 0 |
| | SRS resource 4 | SRS port 0 |

Each SRS resource may further include a time-frequency resource location corresponding to the SRS.

Manner 4
1. Quantity of SRS resource sets is equal to 0 or 2.
2. Two SRS resource sets are configured to be sent in different symbols in two different slots. Each of the two sets includes two SRS resources, or one set is configured as an SRS resource and the other set is configured as three SRS resources.
3. An SRS port of each SRS resource in a given two sets is associated with a different UE antenna port.
4. A higher layer parameter, a resourceType in SRS-ResourceSet set, is set to aperiodic.

Each SRS resource may further include a time-frequency resource location corresponding to the SRS.

For example, one of the two SRS resource sets is configured in a slot n, the other SRS resource set is configured in a slot n+1, and an SRS port of an SRS resource in each SRS resource set is associated with a different UR antenna port, for example, an example shown in FIG. 9 or an example shown in FIG. 13.

Manner 5
1. In a given SRS resource set, each SRS resource includes a single SRS port, and an SRS port of each SRS resource is associated with a different UE antenna port.
2. Alternatively, a maximum quantity of SRS resource sets is 2, each SRS resource set includes one SRS resource, and a quantity of SRS ports for each resource may be 1, 2, or 4.

Each SRS resource may further include a time-frequency resource location corresponding to the SRS.

Manner 1 to Manner 5 are manners of configuring an SRS resource set on a network side. After the SRS resource set is configured on the network side, an association between an antenna port and an SRS port included in an SRS resource in the SRS resource set may be established, that is, operation S1502.

S1502: The terminal device establishes an association between an SRS port and an antenna.

For example, in Manner 1, an association between an SRS port and an antenna is shown in Table 6.

TABLE 6

| SRS resource set | SRS resource | SRS port | Antenna port |
|---|---|---|---|
| Set 1 | SRS resource 1 | SRS port 0 | Antenna port 0 |
| | SRS resource 2 | SRS port 0 | Antenna port 1 |

TABLE 6-continued

| SRS resource set | SRS resource | SRS port | Antenna port |
|---|---|---|---|
| Set 2 | SRS resource 3 | SRS port 0 | Antenna port 2 |
| | SRS resource 4 | SRS port 0 | Antenna port 3 |

After the terminal device establishes the association, it indicates that the terminal device determines a transmit antenna corresponding to each SRS. For example, when the SRS resource 1 includes the sending time point 1 and the frequency domain location 1, and is associated with the antenna port 0, the terminal device needs to send, at the frequency domain location 1 at the sending time point 1, an SRS on a physical antenna (for example, a physical antenna 1) corresponding to the antenna port 0. For another example, when the SRS resource 2 includes the sending time point 2 and the frequency domain location 2, and is associated with the antenna port 1, the terminal device needs to send, at the frequency domain location 2 at the sending time point 2, an SRS on a physical antenna (for example, a physical antenna 2) corresponding to the antenna port 1. Therefore, the terminal device can implement alternating SRS transmission.

In an embodiment of the application, after establishing the association, the terminal device may further adjust the association, so that in an adjusted association, a transmit antenna of an AS SRS whose sending time point is close to a sending time point of a PUSCH is consistent with an adjusted transmit antenna of the PUSCH, to avoid a PUSCH bit error rate caused by antenna switching.

S1503: The network device sends a PUSCH resource to the terminal device, where the PUSCH resource includes a PUSCH time-frequency resource. The PUSCH time-frequency resource includes a sending time point of a PUSCH.

S1504: The terminal device determines that a time difference between a first sending time point of a first AS SRS and a second sending time point of the PUSCH is less than a threshold.

As described above, each SRS resource corresponds to one SRS time domain resource, and includes a sending time point. Table 6 is used as an example. The terminal device may determine sending time points corresponding to four SRS resources. Assuming that a time difference between a sending time point corresponding to the SRS resource 1 and a sending time point of a PUSCH is less than the threshold, a time domain resource corresponding to the SRS resource 1 is a time domain resource corresponding to the first AS SRS.

S1505: The terminal device determines whether an antenna of the first AS SRS is consistent with an antenna of the PUSCH.

For example, the antenna port 0 is used for the PUSCH by default. In operation S1502, after the terminal device establishes the association between the SRS port and the antenna port, when the antenna port associated with the first AS SRS is the antenna port 0, it is determined that the antenna of the first AS SRS is consistent with the antenna of the PUSCH; otherwise, it is determined that the antenna of the first AS SRS is not consistent with the antenna of the PUSCH.

S1506: The terminal device adjusts the association, so that the antenna of the first AS SRS is consistent with the antenna of the PUSCH.

For example, the terminal device may perform adjustment according to the first adjustment policy, the second adjustment policy, or the third adjustment policy. Because the three adjustment policies are described above, details are not described herein again.

It should be noted that an execution sequence of S1501 to S1503 in FIG. 15 may be adjusted. For example, S1503 is performed first, and then S1501 and S1502 are performed. Alternatively, the procedure shown in FIG. 15 may further include another variant solution. For example, the terminal device receives a PUSCH resource, and then receives an SRS resource set. In this case, the terminal device may establish an association between an SRS port and an antenna port based on an antenna port of a PUSCH. For example, when the antenna port 0 is used for the PUSCH by default, an SRS port of a first AS SRS whose sending time point is close to a sending time point of the PUSCH and that is in the SRS resource set is associated with the antenna port 0.

Figure 16:
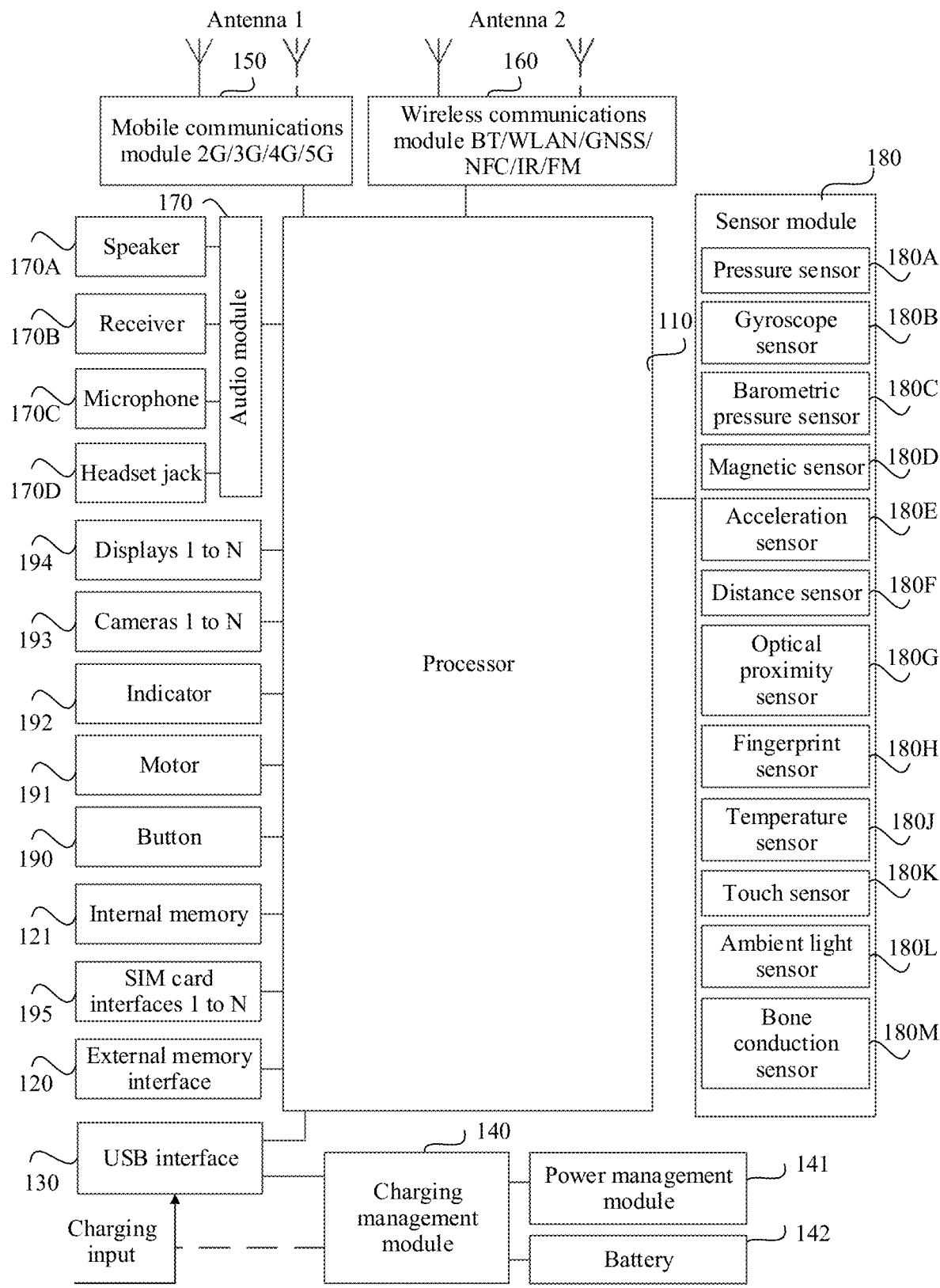
FIG. 16 is a schematic diagram of another structure of a terminal device according to an embodiment of this application.

It may be understood that FIG. 5 is a schematic diagram of a structure of a terminal device. FIG. 16 is a schematic diagram of another structure of a terminal device according to an embodiment of this application. As shown in FIG. 16, the terminal device may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the terminal device. The controller may generate an operation control signal based on instruction operation code and a time sequence signal, to complete control of instruction reading and instruction execution. A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, an application processor and a modem are integrated into the processor 110. For functions of the application processor and the modem, refer to descriptions in FIG. 5.

The USB interface 130 is an interface that conforms to a USB standard specification, and may be a mini USB interface, a micro USB interface, a USB type-C interface, or the like. The USB interface 130 may be configured to connect to a charger to charge the terminal device, or may be configured to transmit data between the terminal device and a peripheral device. The charging management module 140 is configured to receive a charging input from the charger. The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communication function of the terminal device may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

It may be understood that two antennas are used as an example in the figure. Actually, the terminal device may be further provided with more antennas, for example, four antennas, and the plurality of antennas may be configured to alternately send SRSs. Alternatively, the antenna 1 includes one or more antennas, and the antenna 2 includes one or more antennas.

The mobile communications module 150 may provide a wireless communication solution that is applied to the terminal device and that includes 2G/3G/4G/5G or the like. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules of the mobile communications module 150 may be disposed in a same device as at least some modules of the processor 110.

The wireless communications module 160 may provide a wireless communication solution that is applied to the terminal device, and that includes a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 160 may be one or more components integrating at least one communications processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 of the terminal device is coupled to the mobile communications module 150, and the antenna 2 is coupled to the wireless communications module 160, so that the terminal device may communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The display 194 is configured to display a display interface of an application, for example, a viewfinder interface of a camera application. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the terminal device may include one or N displays 194, where N is a positive integer greater than 1.

The terminal device may implement an image shooting function by using the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP, to convert the electrical signal into a digital image signal. The ISP outputs the digital image signal to the DSP for processing. The DSP converts the digital image signal into an image signal in a standard format such as RGB or YUV.

In an embodiment of the application, the terminal device may include N cameras 193 (for example, arrayed cameras), where N is an integer greater than or equal to 2.

The digital signal processor is configured to process a digital signal, and may further process another digital signal in addition to a digital image signal. For example, when the terminal device selects a frequency, the digital signal processor is configured to perform Fourier transform and the like on frequency energy.

The video codec is configured to compress or decompress a digital video. The terminal device may support one or more video codecs. In this way, the terminal device may play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a mode of transfer between human brain neurons, and may further continuously perform self-learning. Applications such as intelligent cognition of the terminal device, for example, image recognition, facial recognition, voice recognition, and text understanding, may be implemented through the NPU.

The internal memory 121 may be configured to store computer-executable program code. The executable program code includes instructions. The processor 110 runs the instructions stored in the internal memory 121, to perform various function applications and data processing of the terminal device. The internal memory 121 may include a program storage area and a data storage area. The program storage area may store an operating system, software code of at least one application (for example, iQIYI or WeChat), and the like. The data storage area may store data (for example, a shot image or a recorded video) or the like generated in a process of using the terminal device. In addition, the internal memory 121 may include a high-speed random access memory, or may include a nonvolatile memory, for example, at least one magnetic disk storage device, a flash memory, or a universal flash storage (UFS).

The external memory interface 120 may be configured to connect to an external storage card, for example, a micro SD card, to extend a storage capability of the terminal device. The external storage card communicates with the processor 110 through the external memory interface 120, to implement a data storage function. For example, files such as images or videos are stored in the external storage card.

The terminal device may implement an audio function such as music playing or recording by using the audio module 170, the speaker 170A, the receiver 170B, the microphone 170C, the headset jack 170D, the application processor, and the like.

The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The pressure sensor 180A is configured to sense a pressure signal, and can convert the pressure signal into an electrical signal. In some embodiments, the pressure sensor 180A may be disposed on the display 194. The gyroscope sensor 180B may be configured to determine a body posture of the terminal device. In some embodiments, angular velocities of the terminal device around three axes (namely, axes x, y, and z) may be determined by using the gyroscope sensor 180B.

The barometric pressure sensor 180C is configured to measure barometric pressure. In some embodiments, the terminal device calculates an altitude based on a barometric pressure value measured by the barometric pressure sensor 180C, to assist in positioning and navigation. The magnetic sensor 180D includes a Hall sensor. The terminal device may detect opening and closing of a flip case by using the magnetic sensor 180D. In some embodiments, when the terminal device is a clamshell phone, the terminal device may detect opening and closing of a flip cover by using the magnetic sensor 180D. Further, a feature such as automatic unlocking upon opening of the flip cover is set based on a detected opening or closing state of the flip cover. The acceleration sensor 180E may detect magnitudes of accelerations of the terminal device in various directions (usually on three axes), and may detect a magnitude and a direction of gravity when the terminal device is still. The acceleration sensor 180E may be further configured to identify a posture of the terminal device, and is applied to an application, for example, a pedometer and switching between a landscape mode and a portrait mode.

The distance sensor 180F is configured to measure a distance. The terminal device may measure a distance by using infrared light or a laser. In some embodiments, in an image shooting scenario, the terminal device may measure a distance by using the distance sensor 180F, to implement quick focusing. The optical proximity sensor 180G may include, for example, a light-emitting diode (LED) and an optical detector, for example, a photodiode. The light-emitting diode may be an infrared light-emitting diode. The terminal device emits infrared light outwards by using the light-emitting diode. The terminal device detects infrared reflected light from a nearby object by using the photodiode. When sufficient reflected light is detected, the terminal device may determine that there is an object near the terminal device. When insufficient reflected light is detected, the terminal device may determine that there is no object near the terminal device. The terminal device may detect, by using the optical proximity sensor 180G, that a user holds the terminal device close to an ear for a call, so that the terminal device automatically performs screen-off for power saving. The optical proximity sensor 180G may also be used in a smart cover mode or a pocket mode to automatically perform screen unlocking or locking.

The ambient light sensor 180L is configured to sense ambient light brightness. The terminal device may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal device is in a pocket, to avoid an accidental touch. The fingerprint sensor 180H is configured to collect a fingerprint. The terminal device may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal device executes a temperature processing policy based on the temperature detected by the temperature sensor 180J. For example, when the temperature reported by the temperature sensor 180J exceeds a threshold, the terminal device lowers performance of a processor located near the temperature sensor 180J, to reduce power consumption to implement thermal protection. In some other embodiments, when the temperature is lower than another threshold, the terminal device heats the battery 142 to avoid abnormal shutdown of the terminal device caused by a low temperature. In some other embodiments, when the temperature is lower than still another threshold, the terminal device boosts an output voltage of the battery 142, to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touch-screen". The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the terminal device at a location different from a location of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The terminal device may receive a button input, and generate a button signal input related to a user setting and function control of the terminal device. The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The touch vibration feedback effect may be further customized. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the terminal device.

It may be understood that the components shown in FIG. 16 do not constitute a limitation on the terminal device. The mobile phone may further include more or fewer components than those shown in the figure, or combine some components, or split some components, or have different component arrangements. In addition, a combination/connection relationship between the components in FIG. 16 may also be adjusted and modified.

Reference to "an embodiment", "some embodiments", or the like described in this specification indicates that one or more embodiments of this application include a feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment, but mean "one or more but not all of the embodiments", unless otherwise emphasized. The terms "include", "comprise", "have", and their variants all mean "include but are not limited to", unless otherwise emphasized.

In addition, according to the context, the term "when" used in the foregoing embodiments may be interpreted as a meaning of "if" or "after" or "in response to determining" or "in response to detecting". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

In embodiments provided in this application, the methods provided in embodiments of this application are described from a perspective in which the terminal device (for example, a mobile phone) is used as an execution body. To implement functions in the foregoing method provided in embodiments of this application, the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on an application and a design constraint condition of the technical solutions.

According to the context, the term "when . . . " used in the foregoing embodiments may be interpreted as a meaning of "if . . . ", "after . . . ", "in response to determining . . . ", or "in response to detecting . . . ". Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)". In addition, in the foregoing embodiments, relationship terms such as first and second are used to distinguish one entity from another entity, but do not limit any actual relationship and sequence between these entities.

All or a part of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedure or functions according to embodiments of the present disclosure are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like. In a case in which no conflict occurs, the solutions in the foregoing embodiments may be combined for use.

It should be noted that a part of this patent application document includes copyright protected content. The copyright owner reserves the copyright except copies are made for the patent documents or the recorded content of the patent documents in the Patent Office.

What is claimed is:

1. A data sending method applied to a terminal device, comprising:
   determining, by the terminal device, that a first sounding reference signals (SRS) needs to be sent by using a first antenna at a first moment, wherein a plurality of antennas are configured for the terminal device, the plurality of antennas are configured to alternately send sounding reference signals (SRSs), the plurality of antennas comprise the first antenna and a second antenna;
   determining, by the terminal device, that a second SRS needs to be sent by using the second antenna at a second moment after the first moment;
   determining, by the terminal device, that first service data needs to be sent by using the first antenna at a third moment after the second moment;
   adjusting, by the terminal device, a transmit antenna of the first SRS as the second antenna, and adjusting a transmit antenna of the second SRS as the first antenna, to enable the transmit antenna of the second SRS to be consistent with a transmit antenna of the first service data; and
   sending, by the terminal device, the first SRS by using the second antenna at the first moment, sending the second SRS by using the first antenna at the second moment, and sending the first service data by using the first antenna at the third moment.

2. The method according to claim 1, wherein a time difference between the third moment and the second moment is less than a threshold less than or equal to 15 microseconds.

3. The method according to claim 1, wherein the determining that the first service data needs to be sent by using the first antenna at the third moment comprises:
   receiving, by the terminal device, an indication message sent by a network side device, wherein the indication message is used to indicate the terminal device to send the first service data by using the first antenna at the third moment.

4. The method according to claim 1, wherein the plurality of antennas further comprise a third antenna, and the method further comprises:
   determining, by the terminal device, that a third SRS needs to be sent by using the third antenna at a fourth moment after the third moment;
   determining, by the terminal device, that second service data needs to be sent by using the first antenna at a fifth moment after the fourth moment;
   adjusting, by the terminal device, a transmit antenna of the second service data as the third antenna, to enable the transmit antenna of the second service data to be consistent with a transmit antenna of the third SRS; and
   sending, by the terminal device, the third SRS by using the third antenna at the fourth moment, and sending the second service data by using the third antenna at the fifth moment.

5. The method according to claim 1, wherein the SRS has an antenna switch (AS) function.

6. The method according to claim 4, further comprising:
   sending, by the terminal device, a notification message to a network side device, wherein the notification message is used to notify the network side device that the transmit antenna of the second service data is the third antenna.

7. The method according to claim 4, further comprising:
sending, by the terminal device, a codebook (CB) SRS to a network side device by using the third antenna at a sixth moment before the fifth moment, and the CB SRS is used to evaluate quality of a transmission channel corresponding to the third antenna, to enable the network side device to receive the second service data on the third antenna based on a quality evaluation result of the transmission channel corresponding to the third antenna, wherein
the CB SRS has a (CB)-based transmission function.

8. The method according to claim 4, wherein the first service data comprises at least one of:
physical uplink shared channel (PUSCH) data, physical uplink control channel (PUCCH) data, and physical random access channel (PRACH) data, and wherein
the second service data comprises at least one of: PUSCH data, PUCCH data, and PRACH data.

9. A terminal device, comprising:
a processor;
a plurality of antennas configured to alternately send sounding reference signals (SRSs); and
a memory coupled to the processor to store instructions, which when executed by the processor, cause the terminal device to perform operations, the operations comprising:
determining that the terminal device needs to send first service data by using a first antenna in the plurality of antennas at a first moment;
adjusting an alternating SRS transmission sequence of the plurality of antennas from a first sequence to a second sequence, wherein in the first sequence, an SRS is sent by using a second antenna at a second moment before the first moment; and in the second sequence, an SRS is sent by using the first antenna at the second moment; and
controlling the SRSs to be sent alternately according to the second sequence by using the plurality of antennas, wherein the first service data is sent by using the first antenna at the first moment.

10. The terminal device according to claim 9, wherein a time difference between the second moment and the first moment is less than a threshold less than or equal to 15 microseconds.

11. The terminal device according to claim 9, the operations further comprising:
receiving an indication message sent by a network side device, wherein the indication message is used to indicate that the terminal device needs to send the first service data by using the first antenna at the first moment.

12. The terminal device according to claim 9, wherein the plurality of antennas further comprise a third antenna, and in the second sequence, an SRS is sent by using the third antenna at a third moment, wherein the third moment is after the first moment; and wherein the operations further comprises:
determining that the terminal device needs to send second service data by using the first antenna at a fourth moment after the third moment;
adjusting a transmit antenna of the second service data as the third antenna; and
controlling the second service data to be sent by using the third antenna at the fourth moment.

13. The terminal device according to claim 9, wherein the SRS has an antenna switch (AS) function.

14. The terminal device according to claim 12, the operations further comprising:
sending a notification message to a network side device, wherein the notification message is used to notify the network side device that the transmit antenna of the second service data is the third antenna.

15. The terminal device according to claim 12, the operations further comprising:
sending a codebook (CB) SRS to a network side device by using the third antenna at a sixth moment before the fourth moment, and the CB SRS is used to evaluate quality of a transmission channel corresponding to the third antenna, to enable the network side device to receive the second service data on the third antenna based on a quality evaluation result of the transmission channel corresponding to the third antenna, wherein
the CB SRS has a (CB)-based transmission function.

16. The terminal device according to claim 12, wherein the first service data comprises at least one of: physical uplink shared channel (PUSCH) data, physical uplink control channel (PUCCH) data, and physical random access channel (PRACH) data, and wherein
the second service data comprises at least one of: PUSCH data, PUCCH data, and PRACH data.

17. A chip system applied to a terminal device, comprising:
an application processor; and
a baseband processor, wherein the chip system is configured to connect to a plurality of antennas configured to alternately send sounding reference signals (SRSs), wherein
the application processor is configured to:
determine that the terminal device needs to send first service data by using a first antenna in the plurality of antennas at a first moment;
adjust an alternating SRS transmission sequence of the plurality of antennas from a first sequence to a second sequence, wherein in the first sequence, an SRS is sent by using a second antenna at a second moment before the first moment; and in the second sequence, an SRS is sent by using the first antenna at the second moment; and
the baseband processor is configured to:
control the SRSs to be sent alternately according to the second sequence by using the plurality of antennas, wherein the first service data is sent by using the first antenna at the first moment.

18. The chip system according to claim 17, wherein a time difference between the second moment and the first moment is less than a threshold less than or equal to 15 microseconds.

19. The chip system according to claim 17, wherein the plurality of antennas are further configured to:
receive an indication message sent by a network side device, wherein the indication message is used to indicate that the terminal device needs to send the first service data by using the first antenna at the first moment.

20. The chip system according to claim 17, wherein the plurality of antennas further comprise a third antenna, and in the second sequence, an SRS is sent by using the third antenna at a third moment after the first moment; and wherein the application processor is further configured to:
determine that the terminal device needs to send second service data by using the first antenna at a fourth moment after the third moment; and
adjust a transmit antenna of the second service data as the third antenna; and the baseband processor is further configured to:
control the second service data to be sent by using the third antenna at the fourth moment.

\* \* \* \* \*